US009791930B1

(12) United States Patent
Rosenberg et al.

(10) Patent No.: US 9,791,930 B1
(45) Date of Patent: Oct. 17, 2017

(54) DETERMINATION OF INPUT FROM FORCE SENSING INPUT DEVICE UNDER AN UNBROKEN EXTERIOR PORTION OF A DEVICE

(71) Applicant: AMAZON TECHNOLOGIES, INC., Reno, NV (US)

(72) Inventors: Ilya Daniel Rosenberg, Mountain View, CA (US); Lakshman Rathnam, Mountain View, CA (US); Nadim Awad, San Francisco, CA (US); John Aaron Zarraga, San Francisco, CA (US); David Charles Buuck, Prunedale, CA (US); Julien George Beguin, San Francisco, CA (US)

(73) Assignee: Amazon Technologies, Inc., Reno, NV (US)

( * ) Notice: Subject to any disclaimer, the term of this patent is extended or adjusted under 35 U.S.C. 154(b) by 166 days.

(21) Appl. No.: 14/693,458

(22) Filed: Apr. 22, 2015

Related U.S. Application Data

(62) Division of application No. 13/792,481, filed on Mar. 11, 2013, now Pat. No. 9,035,752.

(51) Int. Cl.
*G06F 3/01* (2006.01)
*G06F 3/041* (2006.01)
(Continued)

(52) U.S. Cl.
CPC ............ *G06F 3/016* (2013.01); *G06F 1/1684* (2013.01); *G06F 3/044* (2013.01); *G06F 3/045* (2013.01);
(Continued)

(58) Field of Classification Search
CPC ........ G06F 3/016; G06F 3/0414; G06F 3/045; G06F 2203/04106; G06F 2203/04105; G01L 1/2287
See application file for complete search history.

(56) References Cited

U.S. PATENT DOCUMENTS 4,121,049 A 10/1978 Roeber
6,492,979 B1 12/2002 Kent et al.
(Continued)

FOREIGN PATENT DOCUMENTS

CN 201425869 3/2010

OTHER PUBLICATIONS

Young, Lee W., "Patent Cooperation Treaty International Search Report and Written Opinion dated Aug. 4, 2014", Patent Cooperation Treaty Application No. PCT/US14/21101, Patent Cooperation Treaty, Aug. 4, 2014.
(Continued)

*Primary Examiner* — Liliana Cerullo
(74) *Attorney, Agent, or Firm* — Lindauer Law, PLLC

(57) ABSTRACT

User input is accepted by a force sensing resistor ("FSR") assembly, a force sensing capacitor ("FSC") assembly, or both. The FSR or FSC assemblies may be located within an input device, such as behind a device exterior, display, and so forth. A force applied to the device exterior proximate to the assembly may result in a signal indicative of the force to the assembly. The signal may be processed to determine a particular touch zone was activated. A particular action associated with the touch zone may be performed. The particular action may be based at least in part on which touch zone which was activated, a magnitude of the force, or both. For example, the particular action may include a haptic output to provide feedback to a user.

20 Claims, 25 Drawing Sheets

(51) Int. Cl.
*G06F 1/16* (2006.01)
*G06F 3/0488* (2013.01)
*G06F 3/044* (2006.01)
*G06F 3/045* (2006.01)

(52) U.S. Cl.
CPC .......... *G06F 3/0412* (2013.01); *G06F 3/0414* (2013.01); *G06F 3/0488* (2013.01); *G06F 2203/04101* (2013.01); *G06F 2203/04105* (2013.01); *G06F 2203/04106* (2013.01)

(56) References Cited

U.S. PATENT DOCUMENTS

| | | |
|---|---|---|
| 2003/0063073 A1 | 4/2003 | Geaghan et al. |
| 2003/0210235 A1 | 11/2003 | Roberts |
| 2010/0220065 A1 | 9/2010 | Ma |
| 2011/0043457 A1 | 2/2011 | Oliver et al. |
| 2011/0080350 A1* | 4/2011 | Almalki ................ G06F 3/0414 345/173 |
| 2011/0084910 A1* | 4/2011 | Almalki ................ G06F 3/016 345/173 |
| 2011/0084932 A1* | 4/2011 | Simmons .............. G06F 3/0414 345/174 |
| 2011/0260990 A1 | 10/2011 | Ali et al. |
| 2012/0032907 A1* | 2/2012 | Koizumi ............... G06F 3/0414 345/173 |
| 2012/0105358 A1 | 5/2012 | Momeyer et al. |
| 2013/0167663 A1* | 7/2013 | Eventoff ............... G06F 3/044 73/862.627 |

OTHER PUBLICATIONS

Hofsass, Jeffery A., "Non-Final Office Action dated Sep. 26, 2014", U.S. Appl. No. 13/792,481, The United States Patent and Trademark Office, Sep. 26, 2014.

Hofsass, Jeffery A., "Notice of Allowance dated Jan. 23, 2015", U.S. Appl. No. 13/792,481, The United States Patent and Trademark Office, Jan. 23, 2015.

Bengtsson, Johan, "Supplementary European Search Report dated Jan. 2, 2017", European Application No. EP 14 77 9477, EPO, Jan. 2, 2017.

* cited by examiner

DETERMINATION OF INPUT FROM FORCE SENSING INPUT DEVICE UNDER AN UNBROKEN EXTERIOR PORTION OF A DEVICE

PRIORITY

This application is a divisional of, and claims priority to, pending U.S. patent application Ser. No. 13/792,481 filed on Mar. 11, 2013, originally entitled "Force Sensing Input Device" and retitled "Force Sensing Input Device Under An Unbroken Exterior Portion Of A Device" during prosecution. The entirety of U.S. patent application Ser. No. 13/792,481 is hereby incorporated by reference.

BACKGROUND

A wide variety of devices and equipment accept user input. These devices may include electronic book readers ("e-readers"), tablet computers, smartphones, medical devices, and other electrically controlled equipment. This input may be in the form of the user manipulating at least a portion of the device, such a button or a switch. For example, the user may activate a light switch by physically displacing a lever arm. In another example, the user may provide input by pressing a key on a keyboard. Mechanical buttons or switches may provide the user with feedback as to activation, such as an audible or tactile "click."

Figure 1:
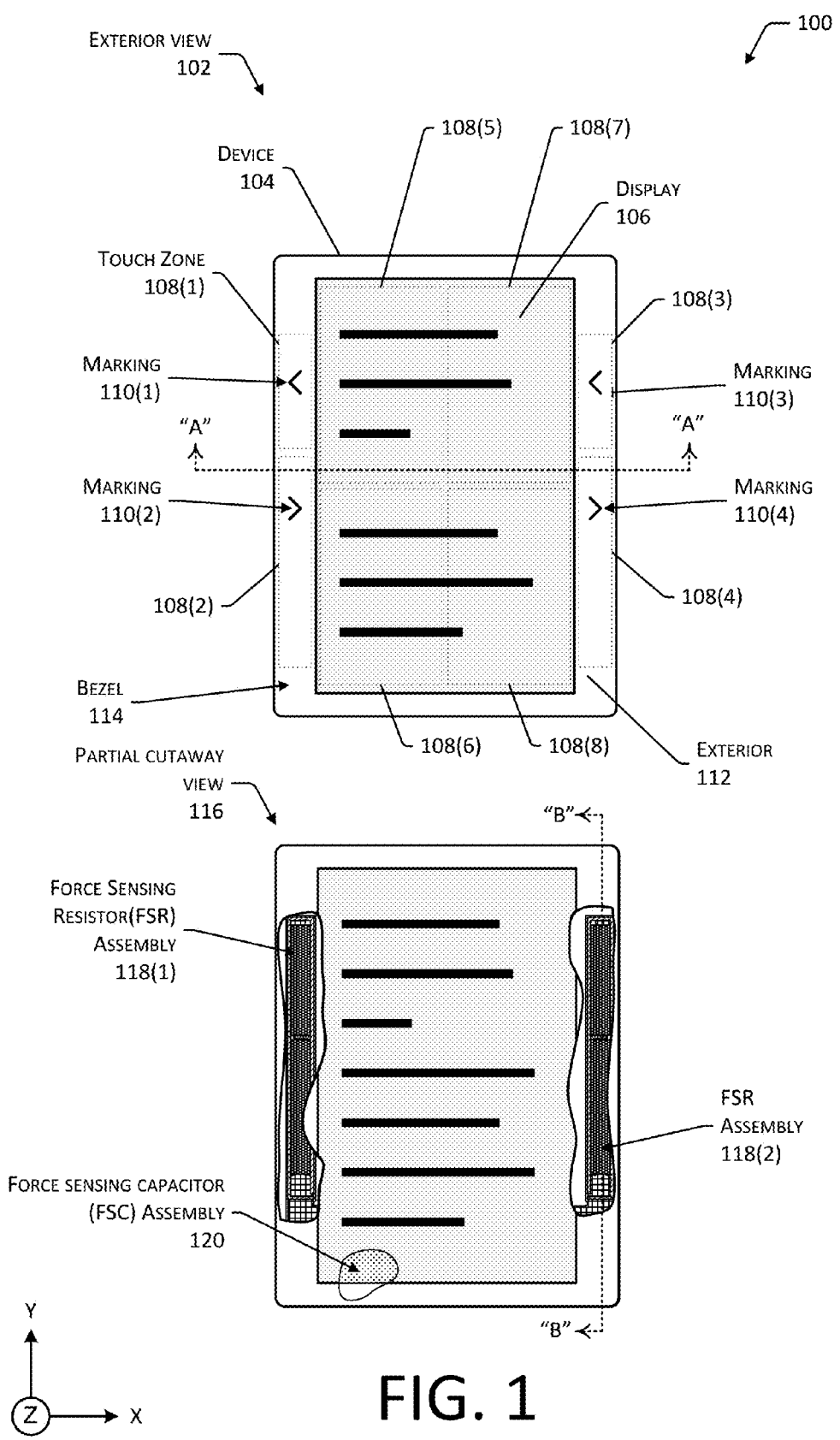
FIG. 1 is an illustrative device using force sensing resistor ("FSR") and force sensing capacitor ("FSC") assemblies to accept user input at several touch zones.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Many devices and pieces of equipment accept user input. Various input devices such as switches and buttons accept this input. These input devices may range from a single button, such as a power button, to a keyboard with over one hundred keys.

Traditional mechanical switches and buttons involve one or more parts which move during operation. For example, a deformable membrane in a dome switch includes a portion which is physically displaced over a distance by force applied by a user. The distance of the physical displacement may range from 0.5 millimeters (mm) or more, depending upon the particular switch design.

The traditional switches and buttons may include other mechanical parts such as levers, spring elements, and so forth. These switches and their associated parts, particularly in small form-factor devices such as portable electronics, pose various industrial design challenges. The physical displacement in a mechanical switch calls for accommodation—the moving portion of the switch needs to be able to move. Furthermore, the strength and durability may be degraded as mechanical elements are reduced in size. The physical requirements of mechanical switches may thus limit the design and implementation of very thin or low profile form-factor devices.

Traditional mechanical switches and buttons may provide haptic feedback to the user upon activation or deactivation through their mechanical actions. For example, the user pressing the deformable membrane in the "dome" switch provides a particular tactile experience to the user's finger. Feedback, such as haptic sensation, provides a useful indication to the user that they have activated the switch. For example, the toggle of a light switch or the "click" of a key on a keyboard provides an immediate sensation that the user has applied sufficient force to activate the switch. Without this feedback the user may inadvertently continue entering an input, apply too much force and damage the input device, and so forth.

Described in this disclosure are two force sensing input devices which may be used independently or in conjunction with one another or with other sensors to detect user input. A first input device is a force sensing resistor input device comprising a force sensing resistor ("FSR") assembly. A second input device is a force sensing capacitor input device comprising a force sensing capacitor ("FSC") assembly. These assemblies may be implemented in a very low profile configuration, having an overall thickness or height of less than 250 micrometers. The assemblies may be configured to detect incident applied forces which result in deflections of a portion of the assembly. Due to the characteristics of the assemblies, very small deflections may be detected. For example, in some implementations the FSR assembly may detect applied forces which result in a deflection of as little as 5 microns, while the FSC assembly may detect applied forces of as little as 0.05 newtons.

One or more of the FSR or FSC assemblies may be arranged beneath a structure, such as a portion of an exterior of the device. In one implementation, a bezel or edge may extend around or along a perimeter of a device such as a tablet computer, e-reader device, and so forth. For example, the bezel may be above or in front of the FSR assembly. The FSR assembly may be coupled to at least a portion of this bezel. The portion of the bezel which the FSR assembly is coupled to may be a single unbroken piece of material, such as a piece of glass, plastic, metal, and so forth. In one implementation a single piece of cover glass may be extended beyond the edges of a display panel, and may extend to a corresponding exterior back portion of the device, to form the bezel. Because the FSR assembly is able to detect incident applied forces which result in very small deflections, the FSR assembly is able to detect applied forces which are transmitted by the bezel material.

The FSR assembly is configured with one or more touch zones. These touch zones are discrete areas within which an applied force may be detected. Different touch zones or combinations of touch zones may be associated with different actions. For example, a first touch zone may be assigned to the action of a forward page turn while a second touch zone may be assigned to the action of a backward page turn.

The FSC assembly may be arranged between the display and a midframe or other internal structure of the device. In this arrangement, touches on the display generate a signal in the FSC assembly which may be used to determine a magnitude of the applied force. The FSC assembly may be configured with one or more touch zones. These touch zones are discrete areas within which an applied force may be detected. Different touch zones or combinations of touch zones may be associated with different actions. For example, a first touch zone may be assigned to the action scrolling up through content while a second touch zone may be assigned to the action of scrolling down through content.

One or more controllers are coupled to the FSR and FSC assemblies. These controllers are configured to determine when a particular touch zone has been activated. The assemblies provide information on a magnitude of an applied force, such as how hard the user is pressing on the portion of the bezel which the FSR assembly is coupled to, or how hard the user is pressing on a quadrant of the display which the FSC is coupled to. Some applied forces may not be intended by the user to activate the touch zone. For example, the user may grasp the device by the bezel, resulting in an application of some force to hold the device. The magnitude of the applied force may be compared against a threshold to designate whether the touch zone has been activated by the user or not. This threshold may be static or dynamically adjusted. For example, a dynamic threshold may vary over time, increasing slowly over time to adjust to the user's grasp to hold the device.

Touches upon one touch zone may also impart an applied force to one or more other touch zones. In some implementations, an overall threshold may be established, such that the summed magnitude reaches or exceeds the overall threshold before activation of any of the touch zones. To determine a summed magnitude of the applied force, the magnitudes of the individual touch zones may be summed.

As described above, an applied force may affect more than one touch zone. To designate which touch zone was intended to be activated, the force magnitude from the touch zones may be compared. A differential or difference between peak magnitudes of the different touch zones may be used to make this designation. For example, a differential of more than 5% between two touch zones may indicate that the touch zone with the greater magnitude of force is to be designated as activated. Continuing the example, a differential of less than 5% may indicate both touch zones are to be activated.

Feedback responsive to the activation of the one or more touch zones may be provided to the user. This feedback may be audible, visual, haptic, or a combination thereof. The controller may be configured to generate an output signal configured to produce the feedback upon the designation that one or more of the touch zones have been activated. In one implementation this output signal may be used to drive a haptic generator, which produces an output which may be tactilely detectable by the user. For example, a piezoelectric actuator may impart a force to a mass within the device resulting in a slight physical displacement of at least a portion of the device and a corresponding haptic output.

FIG. 1 depicts views 100 of an illustrative device. An exterior view 102 of a device 104, such as an e-reader device configured to present electronic books ("e-books"), is depicted. In some implementations the device 104 may include one or more displays 106. The device 104 may also have one or more touch zones 108(1), 108(2), . . . , 108(T). The touch zones 108 are areas upon which an incident applied force, such as a user's touch, may be detected. Particular touch zones 108 may be assigned particular functions.

Markings 110 or other indicia may be provided to indicate the position, function, and so forth of the touch zones 108. The markings 110 may include graphics, text, or other features such as ridges or bumps. The markings 110 may be provided as decals, paint, etching, deposited material, ridges, bumps, etchings, and so forth.

The device 104 includes an exterior 112. The exterior 112 may be in one or more pieces and is configured to at least partially enclose the components of the device 104. In one implementation the exterior 112 may comprise a front cover piece and a back cover piece. The front cover piece is that portion which is proximate to the user during typical usage while the back cover piece is that portion which is distal to the user during typical usage. The front cover piece of the exterior 112 may be configured as a single unbroken piece of material. This material may include glass, plastic, metal, and so forth. In one implementation, the front cover piece may comprise a single piece of material such as cover glass which extends beyond the edges of the display 106 and matches a corresponding back cover piece. The area which extends beyond the edges of the display 106 may be designated as a bezel 114.

One or more of the touch zones 108 may reside at least partly within the bezel 114. For example, as depicted here two touch zones 108(1) and 108(2) are arranged along a left-hand edge of the device 104 in the bezel 114, while two additional touch zones 108(3) and 108(4) are arranged along a right-hand edge of the device 104 in the bezel 114.

A partial cutaway view 116 depicts force sensing resistor ("FSR") assemblies 118(1) and 118(2) beneath the left- and right-hand portions of the bezel 114. The FSR assembly 118 may provide for one or more touch zones 108. In this illustration, a single FSR assembly 118 provides for two touch zones. For example, touches in the touch zones 108(1) and 108(2) may be detected by the FSR assembly 118(1), while touches in the touch zones 108(3) and 108(4) may be detected by the FSR assembly 118(2).

In some implementations, one or more of the FSR assemblies 118 may be arranged proximate to or underneath other elements, such as the display 106. For example, the display 106 may extend almost entirely to the edge of the device 104 and the FSR assembly 118 may be arranged behind the display 106. Pressure applied to the display 106 in the touch zone 108 may thus be detected by the underlying FSR assembly 118.

Instead of, or in addition to the FSR assembly 118, the device 104 may include one or more force sensing capacitor ("FSC") assemblies 120. The FSC assembly 120 measures capacitance between two or more electrodes. These electrodes may be arranged as plates or sheets. In one implementation depicted here in a cutaway, a sensing electrode may be mounted to the back of the display 106 while one or more fixed electrodes may be mounted to a midframe or other internal structure of the device 104. Air or another dielectric material may be arranged between the sending electrode and the fixed electrode. Deflection of the display 106, such as by a user touching the display 106 in the touch zone 108(5), alters the distance between the sending electrode and one or more of the fixed electrodes, which in turn changes the capacitance. This change in capacitance may be detected and used as an input.

The figures in this disclosure are illustrative. In some instances various features have been exaggerated in size for clarity of illustration. The figures are not necessarily to scale and may not necessarily be proportionate with one another.

Figure 2:
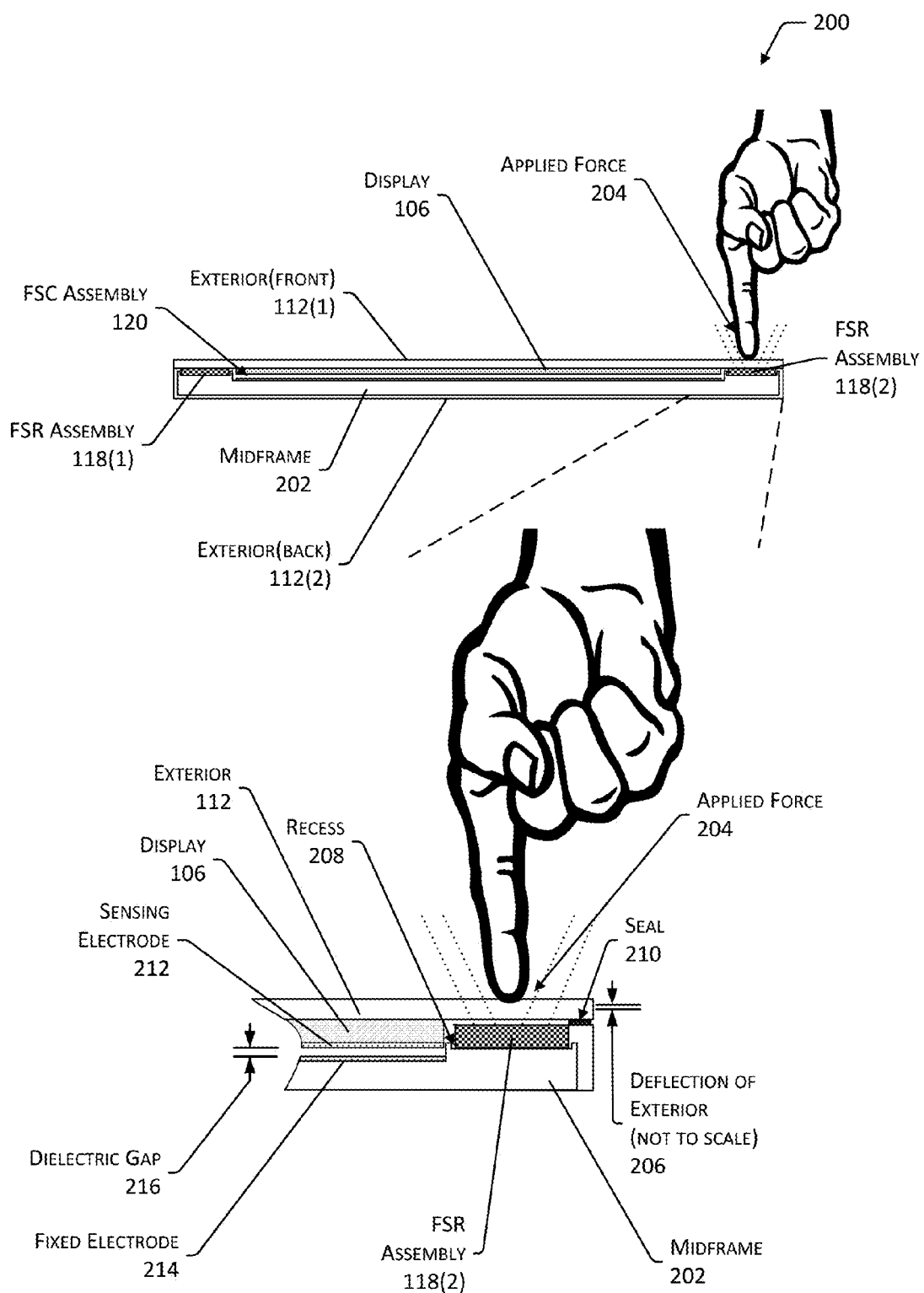
FIG. 2 is a cross sectional side view and enlargement of the device of FIG. 1 and the FSR and FSC assemblies within.

FIG. 2 is a cross sectional side view 200 and enlargement of the device of FIG. 1 and the FSR assembly 118 and the FSC assembly within. This cross section is along the line indicated by broken line "A" in FIG. 1, that is, a cross section along the X axis.

In this illustration, the exterior (front) 112(1) is depicted. Underneath or behind the exterior 112(1) is the display 106. Underneath or behind the display 106 is a midframe 202 or other internal structure. The midframe 202 acts at least in part as a structural member, providing an attachment or mounting point for one or more components of the device 104. The FSC assembly 120 may include components which are attached to, or integral with, the display 106 and the midframe 202. Arranged between the exterior 112(1) and the midframe 202 are the FSR assemblies 118(1) and 118(2).

The user may provide an applied force 204, such as with a touch or a pinch on the device 104. The applied force 204 may be exerted on different portions of the device 104, such as on the display 106, the bezel 114, or other portions of the device 104. The touch may use one or more fingers or be imparted by a device or tool such as a stylus. The applied force 204 results in a deflection 206 of the exterior 112(1), 112(2), or both. Due to the sensitivity of the FSR assembly 118, very small induced deflections 206 may result in measureable forces. In one implementation, the deflection 206 may be at least between 5 and 15 microns (millionths of a meter). Rigid materials such as glass, metal, plastic, and so forth as used in the exterior 112 deflect or deform under the applied force 204 to some degree. The deflection 206 of the exterior 112 and the transmission of the applied force 204 to the FSR assembly 118 are sufficient to generate a signal which may be used to designate activation. Depending upon the material, thickness, and other physical factors, this deflection 206 may be a localized phenomenon, such as within a few mm or centimeters. As a result, deflection 206 of the exterior 112(1) proximate to the touch zone 108(1) may not result in deflection at the touch zone 108(3) on another side of the device 104 which is detectable by the corresponding FSR assembly 118(2).

While the applied force 204 may be sufficient to result in a designated activation of the touch zone 108, the deflection 206 may be imperceptible to some users. As a result, feedback may be provided to the user to confirm that the touch zone 108 has been activated. The feedback may include one or more of audible, visual, or haptic outputs, and is discussed below in more detail.

The midframe 202 may be configured with a recess 208 or other feature configured to accommodate at least a portion of the FSR assembly 118. The midframe 202 may include other features such as alignment or registration features configured to aid assembly of the device 104. The FSR assembly 118 may be mechanically coupled to the exterior 112(1), the midframe 202, or both. In one implementation, the FSR assembly 118 may be adhered to the midframe 202 using an adhesive.

In some implementations a seal 210 may be arranged along a perimeter of the exterior 112. The seal 210 may join two pieces of the exterior 112, join a portion of the exterior 112 to the midframe 202, the FSR assembly 118, or a combination thereof. In one implementation, the seal 210 may comprise an adhesive transfer tape or acrylic elastomer. Use of the seal 210 may increase compliance or deflection 206 of the exterior 112 and improve measurement of the applied force 204 by the FSR assembly 118.

The FSC assembly 120 may be used in conjunction with, or instead of, the FSR assembly 118 to detect and measure the applied force 204. The FSC assembly 120 may comprise a sensing electrode 212 and one or more fixed electrodes 214 separated by a dielectric gap 216. As used in this disclosure, the terms "fixed electrode" and "sensing electrode" are used to differentiate the electrodes. In some implementations the sensing electrode 212 may be attached to a relatively rigid structure while the fixed electrode 214 is attached to the attached to a deformable structure. The dielectric gap 216 may contain a gas, non-conductive foam, gel, aerogel, and so forth. In some implementations the dielectric material may be resilient.

The sensing electrode 212, the fixed electrode 214, or both may comprise a conductive material including a metal, conductive polymer, and so forth. In one implementation the conductive material may comprise part of another assembly. For example, the sensing electrode 212 may comprise a ground plane of the display 106.

The composition and construction of the FSR assembly 118 is discussed in more detail below with regard to FIGS. 4-17. The composition and construction of the FSC assembly 120 is discussed below with regard to FIGS. 22-25.

Figure 3:
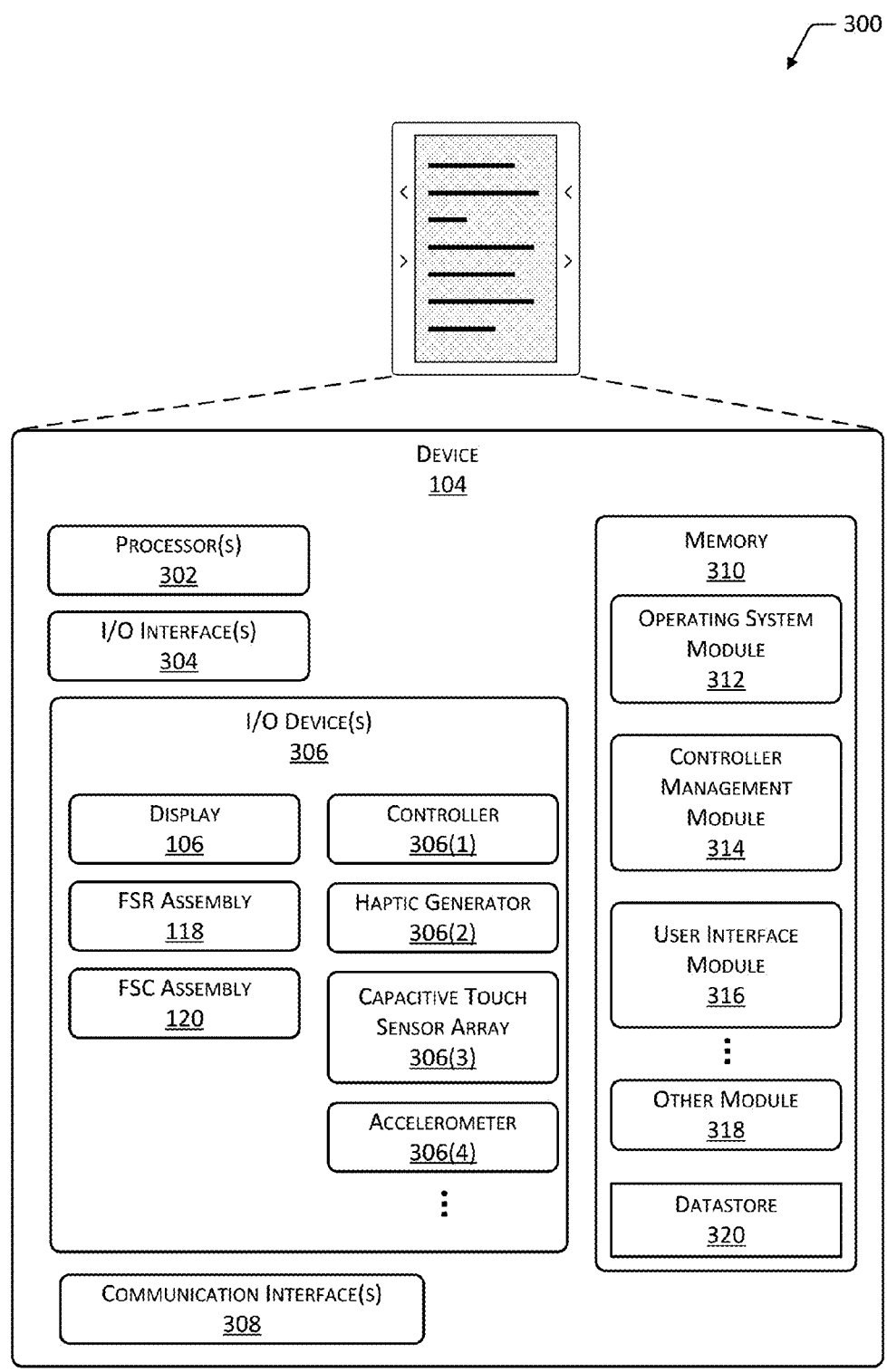
FIG. 3 is a block diagram of the device and the associated components including the FSR assembly, the FSC assembly, and controller.

FIG. 3 is a block diagram 300 of the device 104. The device 104 may include one or more processors 302 configured to execute one or more stored instructions. The processors 302 may comprise one or more cores. The device 104 may include one or more input/output ("I/O") interface(s) 304 to allow the device 104 to communicate with other devices. The I/O interfaces 304 may comprise inter-integrated circuit ("I2C"), serial peripheral interface bus ("SPI"), universal serial bus ("USB"), RS-232, media device interface, and so forth.

The I/O interface(s) 304 may couple to one or more I/O devices 306. The I/O device(s) 306 may include one or more displays 106, FSR assemblies 118, FSC assemblies 120, controllers 306(1), haptic generators 306(2), capacitive touch sensor arrays 306(3), accelerometers 306(4), motion sensors, orientation sensors, and so forth.

The one or more displays 106 are configured to provide visual output to the user. The one or more displays 106 may comprise an electrophoretic or cholesteric material and may be configured to present an image using reflected light, ambient light, light from a front light, and so forth.

The FSR assemblies 118 as described above are configured to detect the applied force 204. The FSR assembly 118 is described below in more detail with regard to FIG. 4-17.

The FSR assemblies 118 may be coupled to the controller 306(1). The controller 306(1) is configured to control and read out the FSR assembly 118 to determine the presence of the applied force 204, a magnitude of the applied force 204, and so forth. The controller 306(1) may be configured to designate that one or more of the touch zones 108 have been activated. Based on this designation, the controller 306(1) may send a signal indicative of activated touch zones 108 to the one or more of the processors 302. In some implementations the controller 306(1) may also be coupled to and configured to drive the haptic generator 306(2) with one or more haptic output waveforms. The haptic output waveforms are configured to provide a particular haptic output from the haptic generator 306(2).

One or more FSC assemblies 120 as described above are configured to detect the applied force 204. The FSC assembly 120 is discussed below in more detail with regard to FIGS. 22-25. The FSC assemblies 120 may be coupled to the controller 306(1). The controller 306(1) is configured to control and read out the FSC assembly 120 to determine changes in the capacitance between one or more pairs of sensing electrodes 212 and fixed electrodes 214 resulting from the presence of the applied force 204. These changes in capacitance may be used to determine a magnitude of the applied force 204, and so forth. In some implementations the controller 306(1) may also be coupled to and configured to drive the haptic generator 306(2) with one or more haptic output waveforms. The haptic output waveforms are configured to provide a particular haptic output from the haptic generator 306(2).

The haptic generator 306(2) is configured to generate a haptic output. The haptic generator 306(2) may include one or more of a piezoelectric actuator, motor with attached mass, voice coil with attached mass, electrical stimulation, artificial muscle, linear motor, and so forth.

The capacitive touch sensor array 306(3) is configured to determine the location of a user's touch based on a change in electrical capacitance. The capacitive touch sensor array 306(3) may comprise a matrix of conductors which are scanned to determine a location of a touch within the matrix. Output from the capacitive touch sensor array 306(3) may be used in conjunction with output from the FSR assembly 118 or the FSC assembly 120. For example, the FSR assembly 118 or the FSC assembly 120 may provide data indicative of the magnitude of the applied force 204, which is unavailable from the capacitive touch sensor array 306(3) alone.

The device 104 may also include one or more communication interfaces 308 configured to provide communications between the device 104 and other devices. Such communication interface(s) 308 may be used to connect to one or more personal area networks ("PAN"), local area networks ("LAN"), wide area networks ("WAN"), and so forth. For example, the communications interfaces 308 may include radio modules for a WiFi LAN and a Bluetooth PAN.

The device 104 may also include one or more busses or other internal communications hardware or software that allow for the transfer of data between the various modules and components of the device 104.

As shown in FIG. 3, the device 104 includes one or more memories 310. The memory 310 comprises one or more computer-readable storage media ("CRSM"). The CRSM may be any one or more of an electronic storage medium, a magnetic storage medium, an optical storage medium, a quantum storage medium, a mechanical computer storage medium and so forth. The memory 310 provides storage of computer readable instructions, data structures, program modules and other data for the operation of the device 104.

The memory 310 may include at least one operating system (OS) module 312. The OS module 312 is configured to manage hardware resources such as the I/O interfaces 304 and provide various services to applications or modules executing on the processors 302. Also stored in the memory 310 may be a controller management module 314, a user interface module 316, and other modules 318.

The controller management module 314 is configured to provide for control and adjustment of the controller 306(1). For example, the controller management module 314 may be used to set user-defined preferences in the controller 306(1).

The user interface module 316 is configured to provide a user interface to the user. This user interface may be visual, audible, haptic, or a combination thereof. For example, the user interface module 316 may be configured to present an image on the display 106 and process the inputs of applied forces 204 at particular touch zones 108 to take particular actions, such as paging forward or backward in an e-book.

The user interface module 316 may be configured to respond to one or more signals from the control 306(1). These signals may be indicative of the magnitude of the applied force 204, the duration of the applied force 204, or both within a given touch zone 108. For example, the user interface module 316 may interpret a low magnitude (light touch) on the touch zone 108(4) as a command to present on the display 106 a next page in an e-book. In comparison, in that same touch zone, a high magnitude or heavy touch on the touch zone 108(4) may be interpreted as a command to change to a next chapter.

Other modules 318 may be stored in the memory 310. For example, a rendering module may be configured to process e-book files for presentation on the display 106.

The memory 310 may also include a datastore 320 to store information. The datastore 320 may use a flat file, database, linked list, tree, or other data structure to store the information. In some implementations, the datastore 320 or a portion of the datastore 320 may be distributed across one or more other devices including servers, network attached storage devices, and so forth.

The datastore 320 may store information about one or more haptic output waveforms, user preferences, and so forth. As described above, the haptic output waveforms are configured to produce particular haptic effects when rendered by one or more of the haptic generators 306(2). Other data may be stored in the datastore 320 such as e-books, video content, and so forth.

While processors 302 and memory 310 are depicted here, it is understood that the FSR assembly 118 and the controller 306(2) may be used in other devices which lack these or other elements. For example, the FSR assembly 118 and the controller 306(2) may be used as a switch to control a table lamp.

Figure 4:
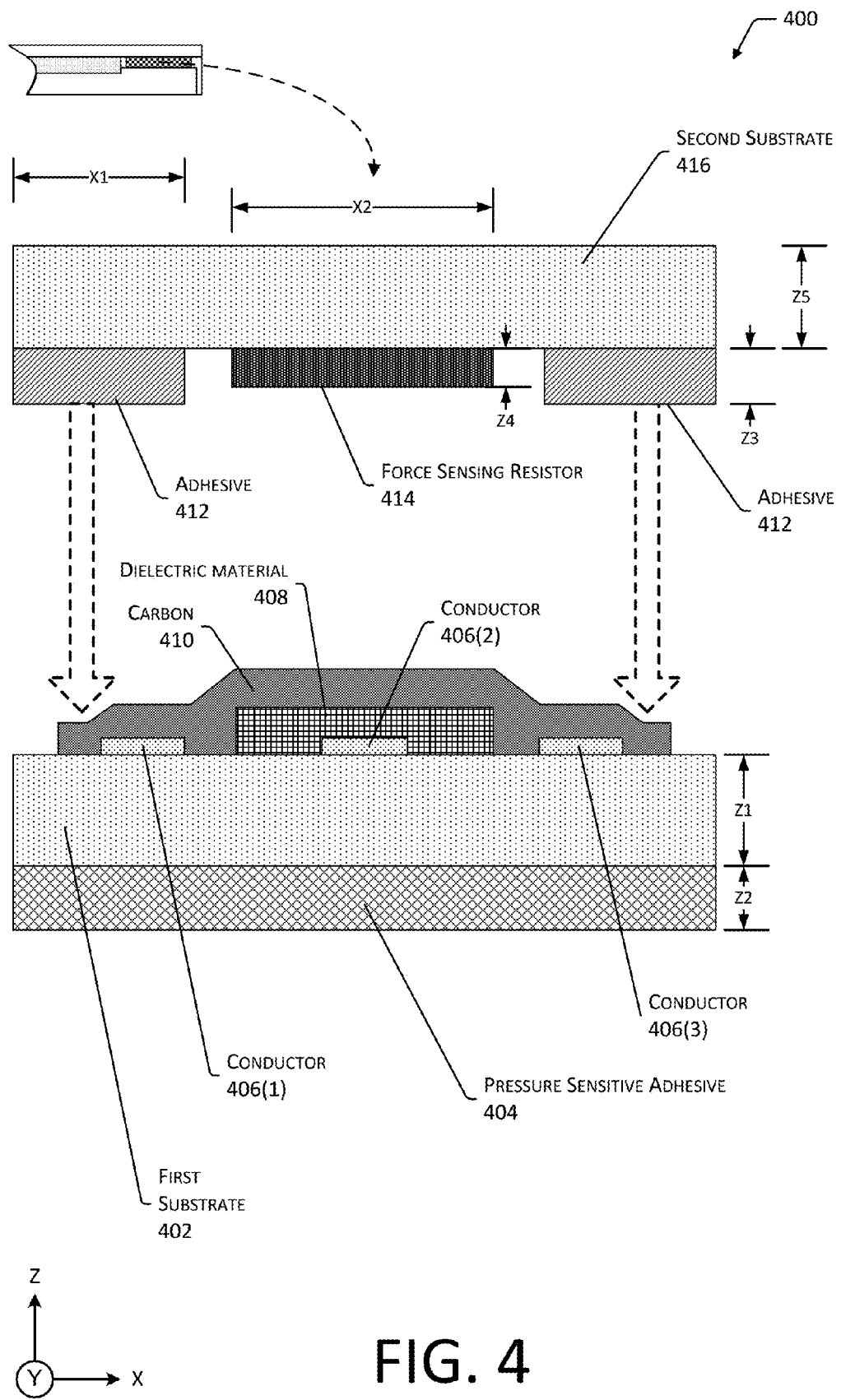
FIG. 4 is a cross sectional view of the FSR assembly illustrating the different layers in the assembly.

FIG. 4 is an enlarged cross sectional view 400 along the line "A-A" of the FSR assembly 118. The depicted portion of the FSR assembly 118 is that which is within one of the touch zones 108, and is thus sensitive to the applied force 204. Other portions of the FSR assembly 118, such as a connection pad may have an alternative configuration.

For the purposes of discussion and not by way of limitation, the terms "above" and "below" or "front" and "back" are used relative to the Z axis indicated here. The Z axis is orthogonal to a primary plane of the FSR assembly 118, wherein the primary plane is defined by the two longest axes of the FSR assembly 118 which are orthogonal to one another.

A first substrate 402 is depicted. The first substrate 402 may comprise a polymer, printed circuit board, paper, an exterior casing of the device, an internal component such as a frame, and so forth. The first substrate 402 may be an electrical insulator at voltages used in the FSR assembly 118. In one implementation the first substrate 402 may comprise polyethylene terephthalate ("PET"). In one implementation, the first substrate 402 may have a thickness Z1 (as measured along the Z axis) of about 75 micrometers.

A pressure sensitive adhesive 404 is applied to the back of the first substrate 402. The pressure sensitive adhesive ("PSA") 404 may comprise ethylene-vinyl acetate, silicone rubbers, styrene block copolymers, and so forth. The PSA 404 may be used to adhere at least a portion of the FSR assembly 118 to the midframe 202. In one implementation, the PSA 404 may have a thickness Z2 (as measured along the Z axis) of about 50 micrometers. In some implementations, the PSA 404 may be omitted.

In this disclosure, the term "apply" or "applying" may include one or more processes involving vapor deposition, fluidic material deposition using a plurality of jets, physical vapor deposition, material transfer from a subsequently removed carrier, screen printing, lamination, selective laser sintering, and so forth. For example, the PSA 404 may be applied by spraying adhesive material onto the first substrate 402.

On the front of the first substrate 402, a plurality of conductors 406 are applied in a pattern configured to provide for one or more electrically discrete touch zones 108. In this illustration, three conductors 406(1)-(3) are depicted, suitable for a FSR assembly 118 with two electrically discrete touch zones 108. One conductor 406 may be provided for each of the touch zones 108, while one conductor 406 may be used as a common or ground. The conductor 406 may comprise a conductive polymer, metal, and so forth. For example, in some implementations the conductor 406 may comprise silver or aluminum.

One or more portions of dielectric material 408 may be applied to at least a portion of the one or more conductors 406. For example, as illustrated in this cross section, the conductor 406(2) in the midst of the other conductors 406(1) and 406(3) is covered with the dielectric material 408. The dielectric material 408 may comprise a polymer, ceramic, aerogel, or other material which acts as an insulator at the voltages used in the FSR assembly 118.

One or more conductive carbon 410 traces or other structures are applied atop at least a portion of the conductors 406 which are uncovered by the dielectric material 408. The carbon 410 traces are configured such that each of the traces electrically couple to a different conductor 406. The conductive carbon 410 traces may also extend over the top of the dielectric material 408, as depicted here. In other implementations the carbon 410 traces may be replaced with other materials, such as metals, electrically conductive polymers, quantum tunneling composites, and so forth. In this implementation, the carbon 410 is deposited such that the profile is a series of stepped elevation changes. In some implementations the carbon 410 may be omitted, and the conductors 406 may be extended to form the features described below, such as in FIG. 7.

An adhesive 412 may be applied atop the plurality of the carbon 410 features and the dielectric material 408. The adhesive 412 may be arranged around at least a portion of a perimeter of the first substrate 402. The adhesive 412 may be deposited as one or more beads. In some implementations a small gap may be left in in the adhesive 412 around the perimeter to allow for equalization of air pressure between an interior of the FSR assembly 118 and the ambient atmosphere to avoid "ballooning" or crumpling. In another implementation the adhesive 412 or other portions of the FSR assembly 118 may be semi-permeable to one or more atmospheric gasses. In one implementation, the adhesive 412 may have a thickness Z3 (as measured along the Z axis) of about 15 micrometers and may have a width X1 (as measured along the X axis) of about 1 mm.

One or more sections of force sensing resistor ("FSR") 414 material are applied atop the carbon 410 features. The FSR 414 material may include a conductive polymer or other material which exhibits a predictable change in resistance upon application of a force to the material. Each of the one or more sections of the FSR 414 material are such that each section electrically couples to two or more carbon 410 features. In one implementation, the FSR 414 may have a thickness Z4 (as measured along the Z axis) of about 50 micrometers and may have a width X2 (as measured along the X axis) of about 1.5 mm.

A second substrate 416 may be atop the one or more sections of FSR 414 material and the one or more adhesive 412 elements. The second substrate 416 may have a thickness Z5 (as measured along the Z axis) of about 75 micrometers. The second substrate 416 may comprise the same material as the first substrate 402. In one implementation, the first substrate 402 and the second substrate 416 may comprise a single piece, such a single piece which is at least partially folded such that the first substrate 402 acts also as the second substrate 416 when assembly is complete.

In some implementations the second substrate 416 may be omitted. For example, the FSR assembly 118 without the second substrate 416 may be bonded to an interior surface of the exterior 112.

In some implementations the first substrate 402, the PSA 404, the conductors 406, the dielectric material 408, and the carbon 410 may be fabricated as a unit. This unit may be designated a lower assembly. The remaining components described next may also be fabricated as a unit, which may be designated an upper assembly. The upper assembly and the lower assembly may be joined, as indicated by the arrows, to form the FSR assembly 118.

Figure 5:
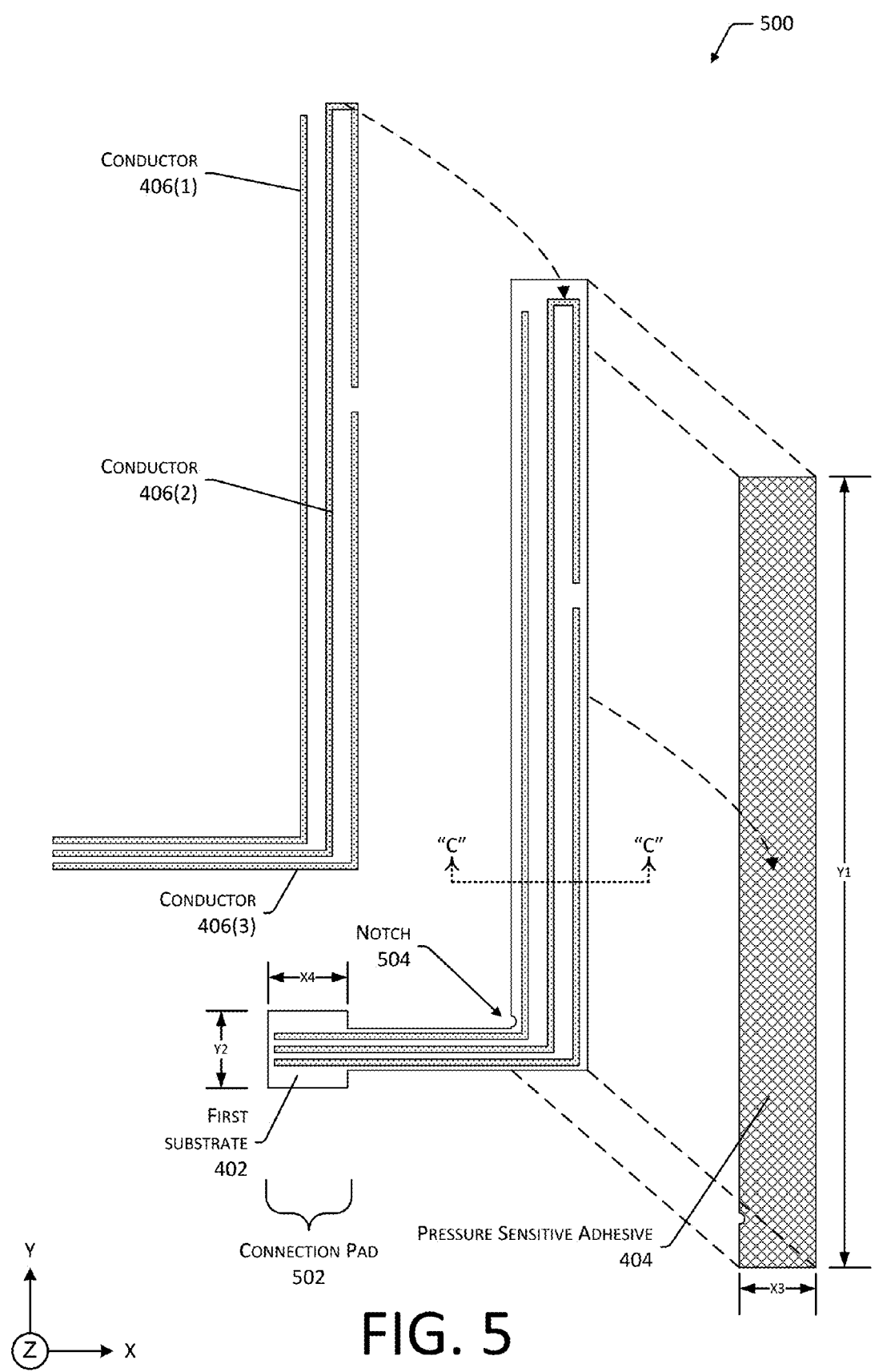
FIGS. 5-10 illustrate the various layers of an FSR assembly.

FIGS. 5-10 illustrate the various layers of the FSR assembly 118 as depicted in FIG. 4. FIG. 5 depicts a view 500 of the conductors 406(1)-406(3) as they may be applied to the first substrate 402. Also applied to the first substrate 402 on a side opposite the conductors 406 is the PSA 404. The PSA 404 may be formed as a sheet, ring, or other structure in the X-Y plane. As shown here, the PSA 404 is a contiguous sheet. In one implementation, the PSA 404 may have a width X3 of about 4 mm and a length Y1 of about 75 mm.

A portion of the first substrate 402 as depicted may be flared or expanded to form a connection pad 502. The connection pad 502 provides a point to couple the conductors 406 of the FSR assembly 118 to the controller 306(1). In this illustration the connection pad 502 may have a width X4 of about 3 mm and a length Y2 of about 4 mm. In other implementations, the connection pad 502 may have a different shape.

A notch 504 is depicted in the first substrate 402. The notch 504 may provide for engagement with a feature in the midframe 202 to assist in assembly of the device 104. The notch 504 may also provide for strain relief.

Figure 6:
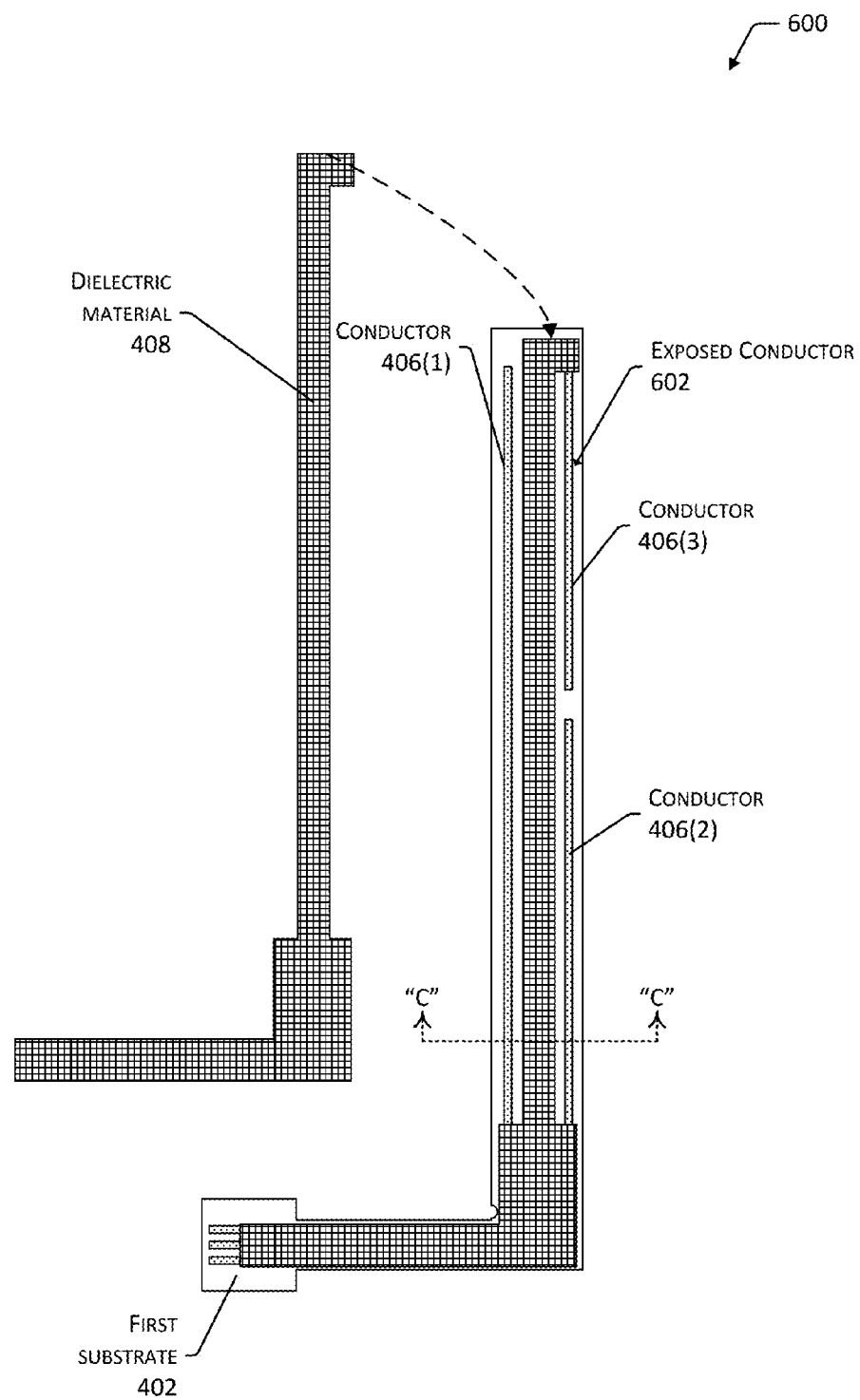

FIG. 6 illustrates application 600 of the dielectric material 408 atop the conductors 406 of FIG. 5. One or more pieces of dielectric material 408 may be applied atop the conductors 406 such that a plurality of exposed conductors 602 remain. In this illustration, a portion of each of the conductors 406(1), 406(2), and 406(3) remain exposed.

Figure 7:
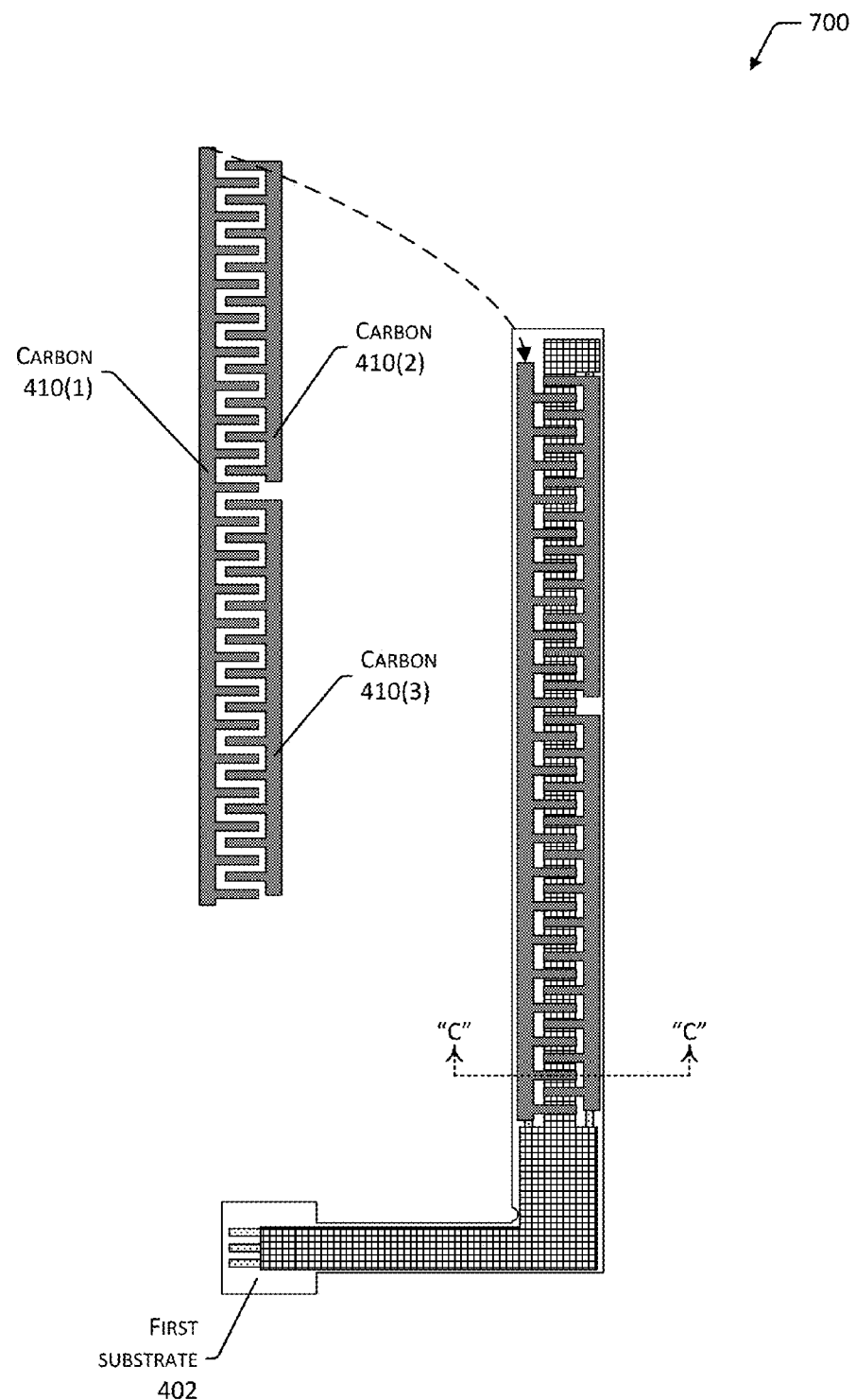

FIG. 7 illustrates application 700 of the carbon 410 atop the conductors 406 and the dielectric material 408, as depicted in FIG. 6. A plurality of carbon 410 traces is applied. A pattern described by the carbon 410 is configured such that a single portion of carbon 410 couples to a single conductor 406. In this illustration, three carbon traces 410 (1)-(3) are depicted. These traces are configured to provide complementary patterns, such as a serpentine or interlocking set of patterns. However, the traces are configured such that the carbon 410 of different traces is not in electrical contact.

Figure 8:
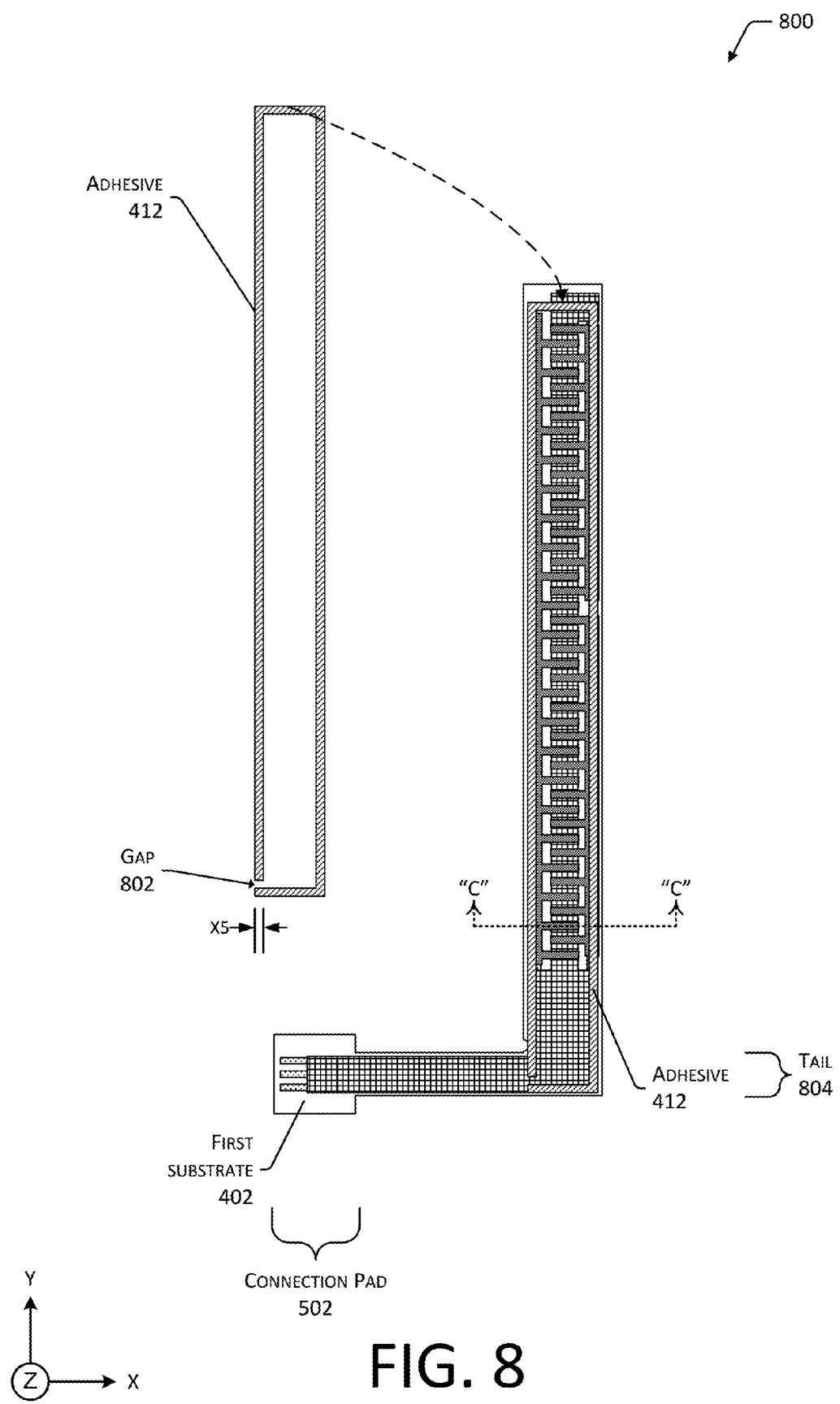

FIG. 8 illustrates application 800 of the adhesive 412 around a perimeter of the first substrate 402. The adhesive 412 may be arranged as a ring around the perimeter of the first substrate 402. The adhesive 412 may have a width X5 of about 1 mm.

As illustrated here, a small gap 802 may be provided in the adhesive 412. This gap 802 allows for pressure equalization between the interior of the FSR assembly 118 and the ambient atmosphere. The gap 802 may be approximately aligned with a center of a tail 804 which leads to the connection pad 502.

Figure 9:
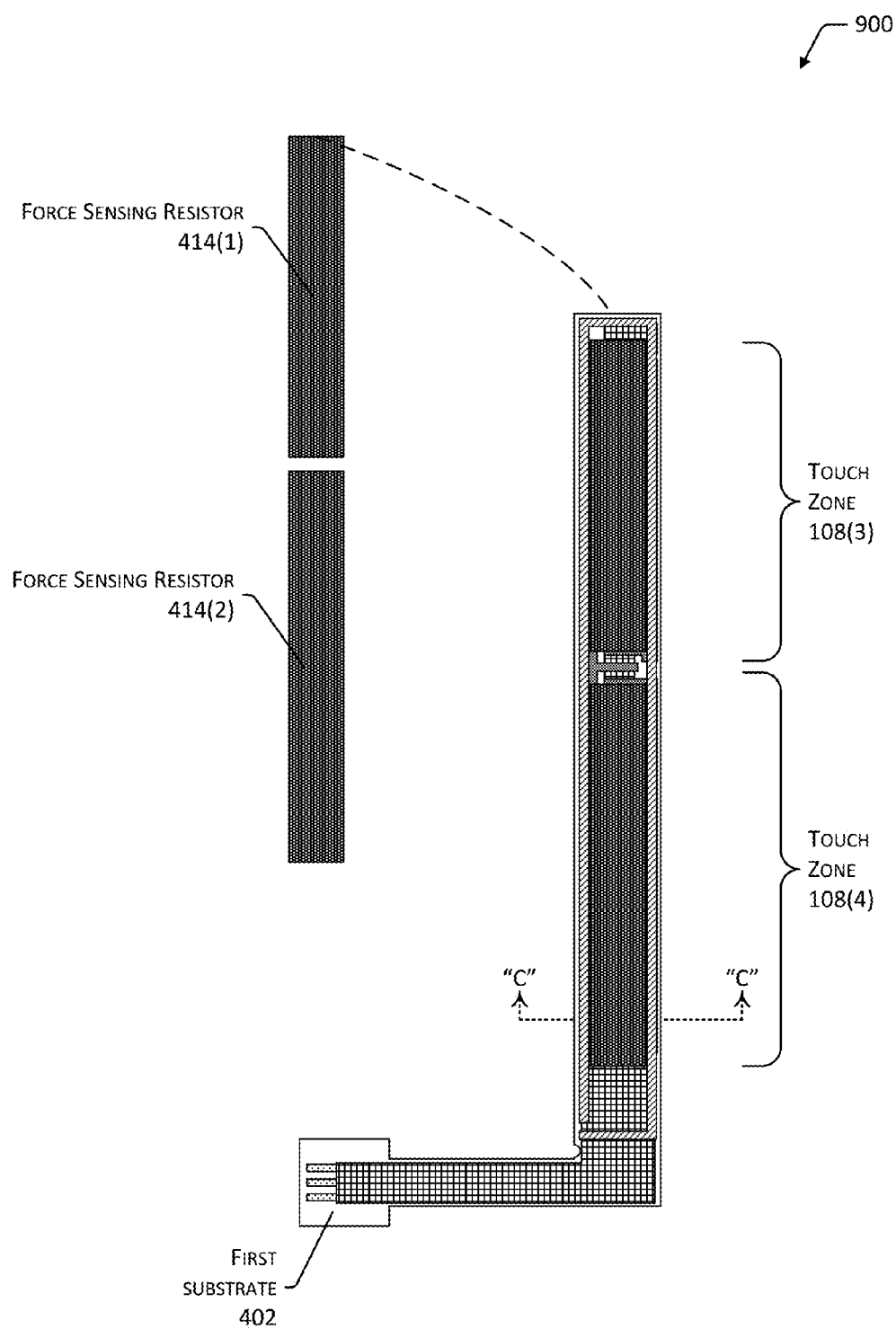

FIG. 9 illustrates application 900 of the FSR 414 material. In this illustration, two portions of FSR material 414 are applied. Each portion is configured to come into electrical contact with two or more of the carbon 410 traces. For example, in this illustration, the FSR 414(1) is in electrical contact with the carbon 410(1) and 410(2), while the FSR 414(2) is in electrical contact with the carbon 410(1) and 410(3).

Each touch zone 108 is defined by a different and electrically separate portion of FSR 414 material. In this illustration, the area defined by the FSR 414(1) provides the touch zone 108(3), while the area defined by the FSR 414(2) defines the touch zone 108(4).

Figure 10:
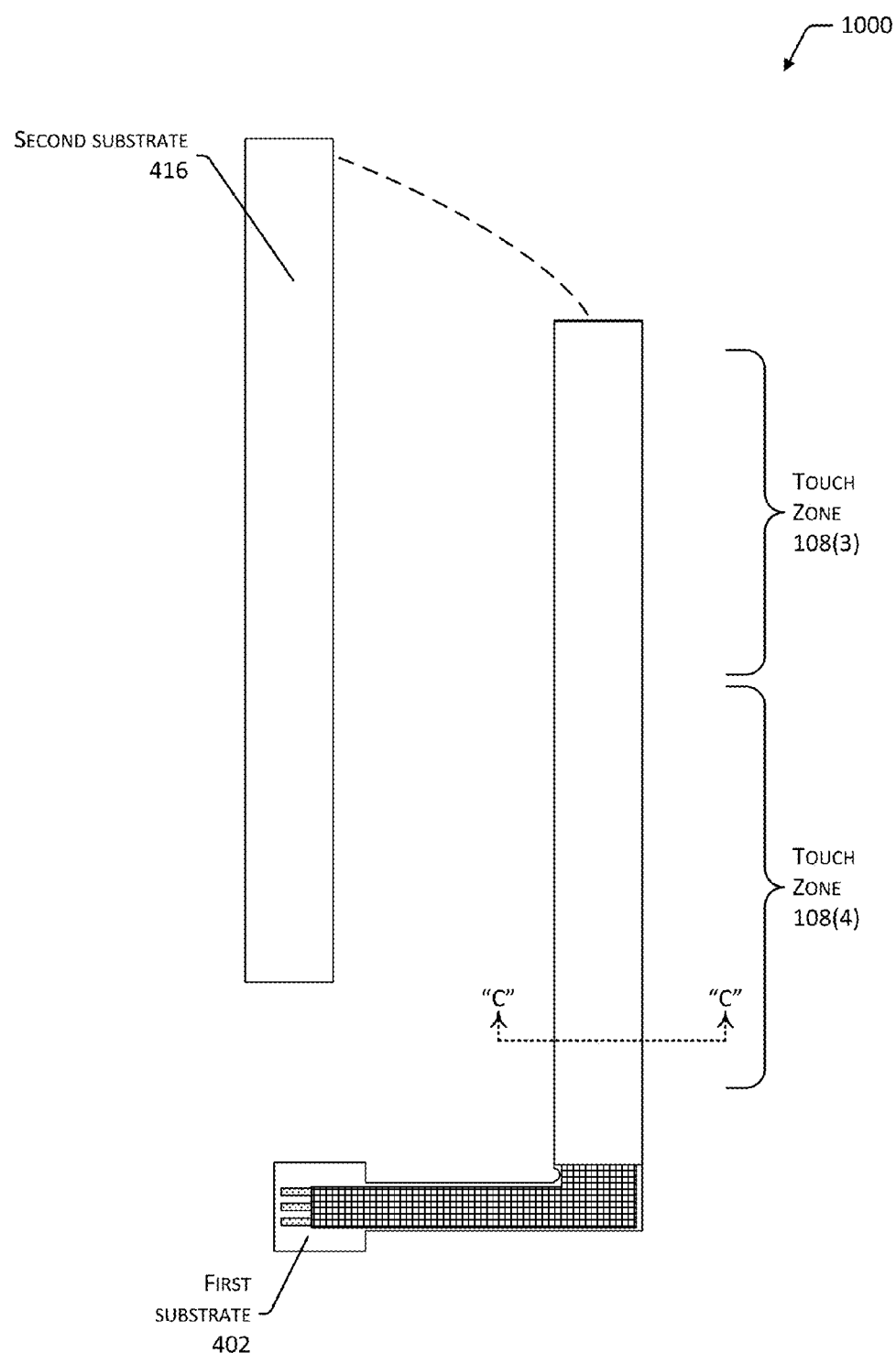

FIG. 10 illustrates application 1000 of the second substrate 416 atop the FSR 414 of FIG. 9 and the adhesive 412 of FIG. 8. With the second substrate 416 in place, the FSR assembly 118 is complete and may be connected to the controller 306(1).

Figure 11:
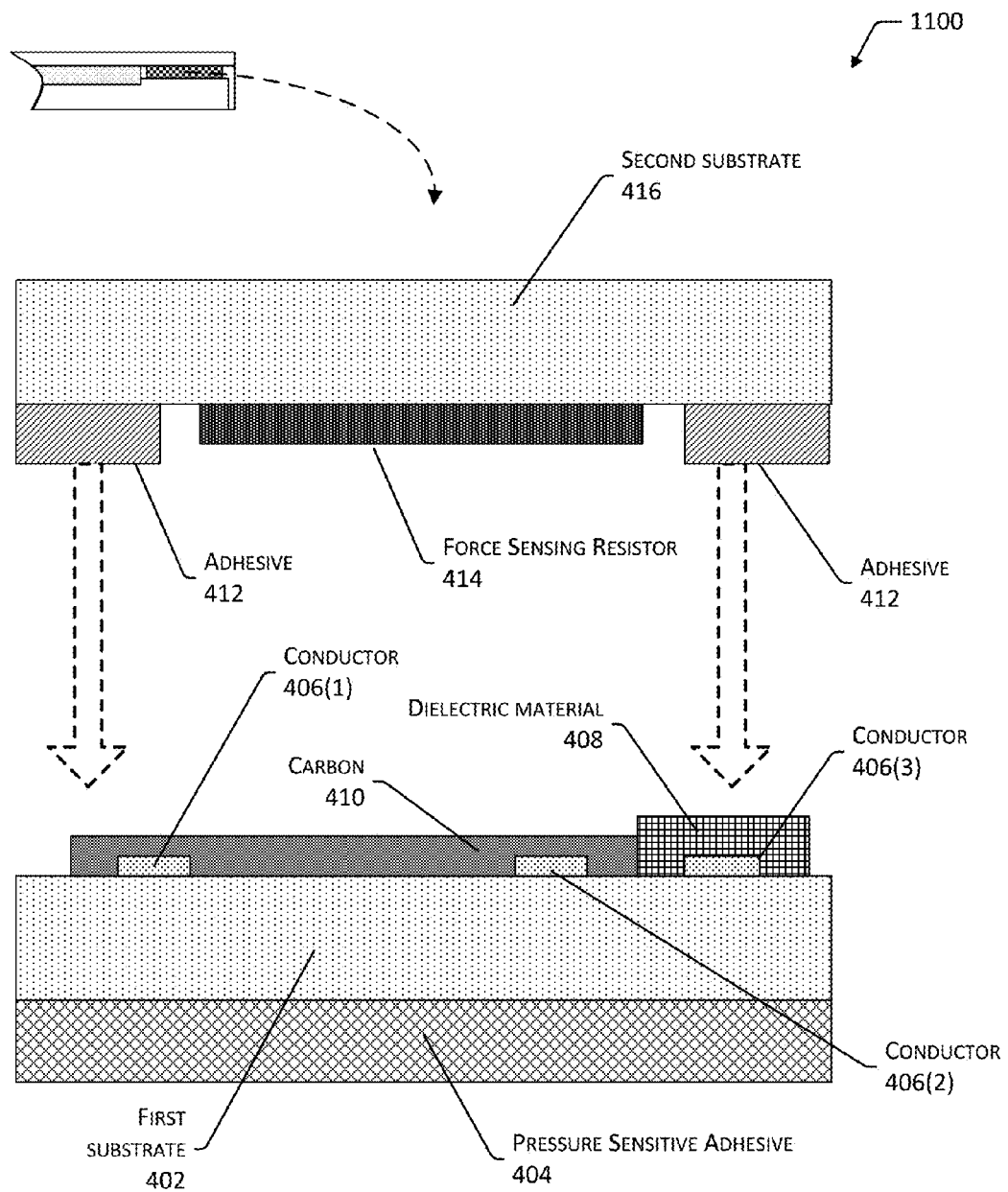
FIG. 11 is a cross sectional view of an alternative FSR assembly illustrating the different layers in the assembly.

FIG. 11 is a cross sectional view 1100 of an alternative FSR assembly 118. In this alternative assembly, the dielectric material 408 encloses a conductor 406 which is proximate to an edge of the first substrate 402.

As above with respect to FIG. 4, the back of the first substrate 402 is coupled to the pressure sensitive adhesive 404. On the front of the first substrate 402, the plurality of conductors 406 are applied in a pattern configured to provide for one or more electrically discrete touch zones 108. In this illustration, three conductors 406(1)-(3) are depicted, suitable for a FSR assembly 118 with two electrically discrete touch zones 108.

One conductor 406 may be provided for each of the touch zones 108, while one conductor 406 may be used as a common or ground. One or more portions of dielectric material 408 may be applied to at least a portion of the one or more conductors 406. For example, as illustrated in this cross section, the conductor 406(3) which is proximate to an edge of the first substrate 402 is covered with the dielectric material 408.

The layer of conductive carbon 410 is applied atop at least a portion of the conductors 406 which are uncovered by the dielectric material 408. In some implementations the carbon 410 may be omitted, and the conductors 406 may be extended to form the features described below, such as in FIG. 14.

The adhesive 412 may be applied atop the plurality of the carbon 410 features and the dielectric material 408. As above, the adhesive 412 may be arranged around at least a portion of a perimeter of the first substrate 402.

One or more sections of force sensing resistor ("FSR") 414 material are applied atop the carbon 410 features. Each of the one or more sections of the FSR 414 material are such that each section electrically couples to two or more carbon 410 features.

The second substrate 416 may be atop the one or more sections of FSR 414 material and the one or more adhesive 412 elements. As above, in some implementations the second substrate 416 may be omitted. For example, the FSR assembly 118 without the second substrate 416 may be bonded to an interior surface of the exterior 112.

In some implementations the first substrate 402, the PSA 404, the conductors 406, the dielectric material 408, and the carbon 410 may be fabricated as a unit. This unit may be designated a lower assembly. The remaining components described next may also be fabricated as a unit, which may be designated an upper assembly. The upper assembly and the lower assembly may be joined, as indicated by the arrows, to form the FSR assembly 118.

Figure 12:
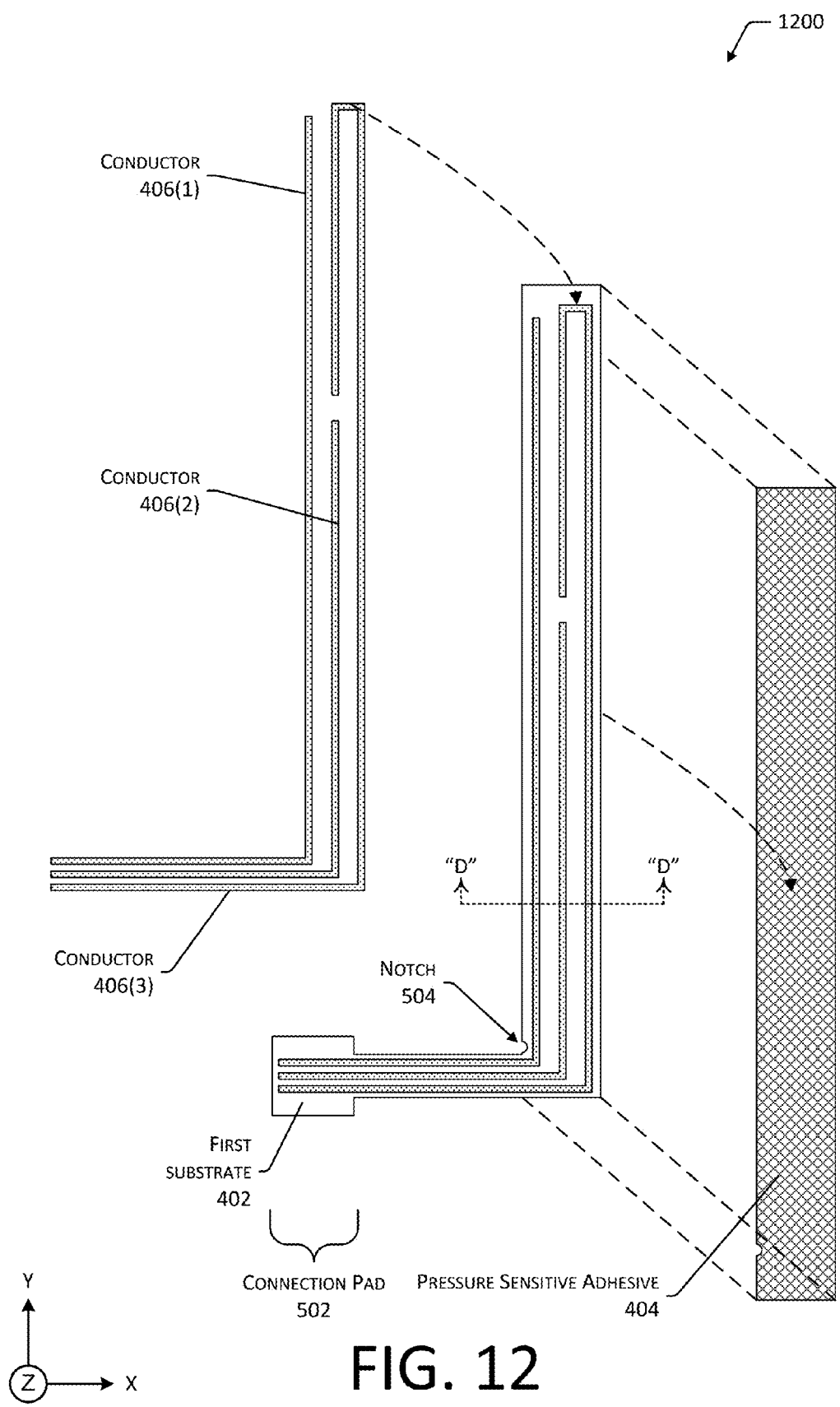
FIGS. 12-17 illustrate the various layers of the alternative FSR assembly.

FIG. 12 depicts a view 1200 of the conductors 406(1)-406(3) as they may be applied to the first substrate 402 in the implementation described in FIG. 11. Also applied to the first substrate 402 on a side opposite the conductors 406 is the PSA 404.

As above with regard to FIG. 5, a portion of the first substrate 402 may be flared or expanded to form the connection pad 502. The notch 504 is also depicted in the first substrate 402.

Figure 13:
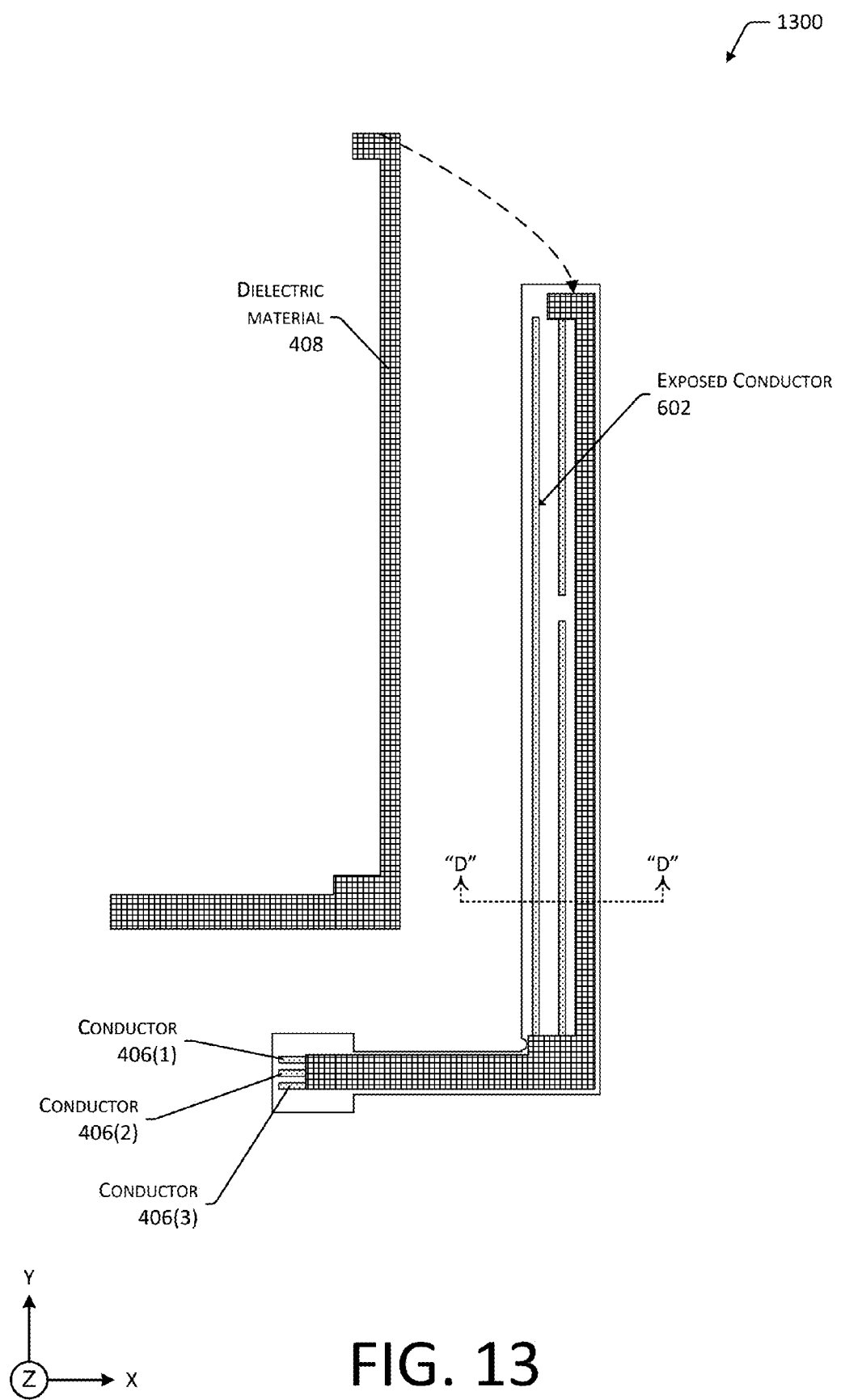

FIG. 13 illustrates application 1300 of the dielectric material 408 atop the conductors 406 of FIG. 12. One or more pieces of dielectric material 408 may be applied atop the conductors 406 such that a plurality of exposed conductors 602 is provided. In this illustration, a portion of each of the conductors 406(1), 406(2), and 406(3) remain exposed.

Figure 14:
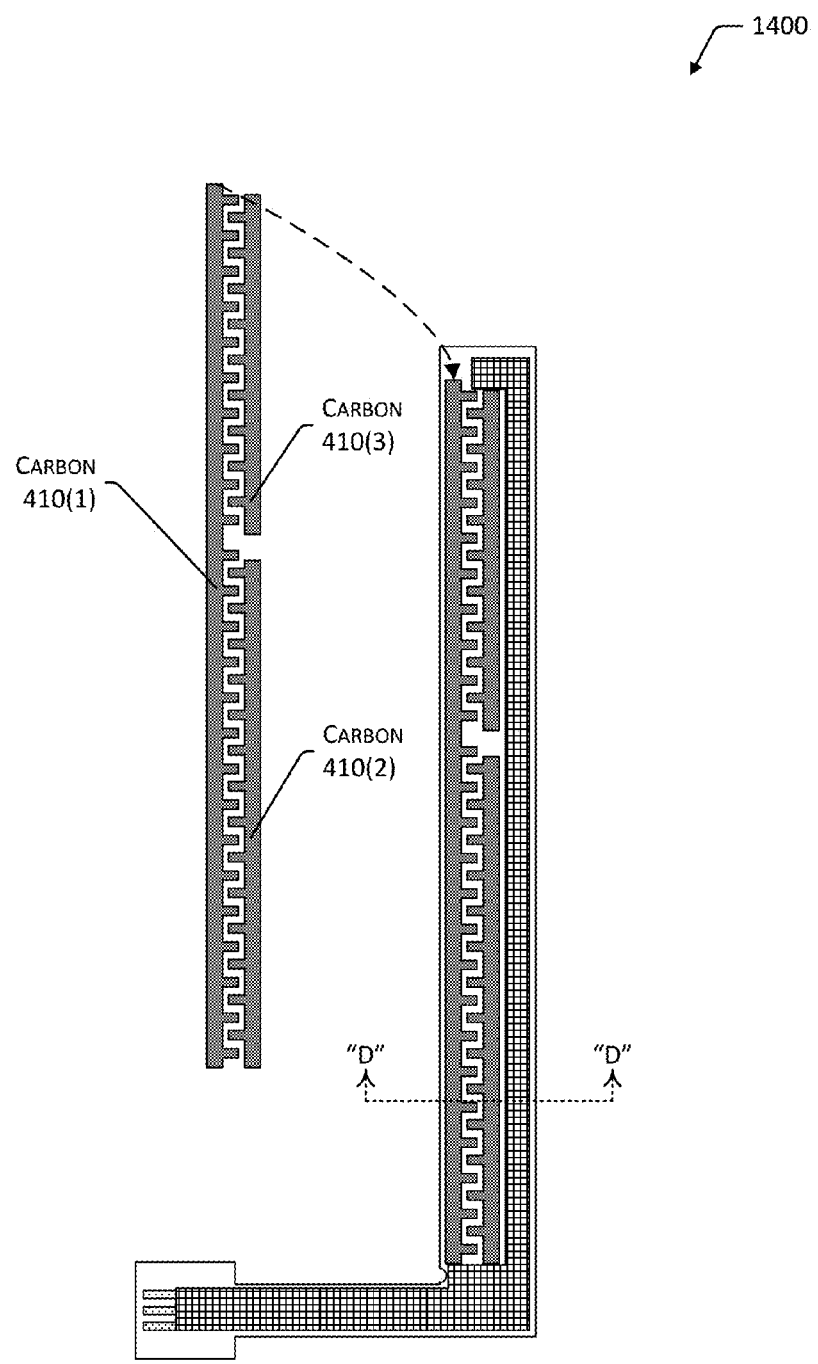

FIG. 14 illustrates application 1400 of the carbon 410 atop the conductors 406 and the dielectric material 408. A plurality of carbon 410 traces or other structures are applied. The pattern described by the carbon 410 is configured such that a single portion of carbon couples to a single conductor 406. In this illustration, three carbon traces 410(1)-(3) are depicted. These carbon 410 traces are configured to provide complementary patterns, such as a serpentine or interlocking set of patterns. However, the carbon 410 traces are configured such that each of the carbon 410 traces couple to different conductors 406 which are not in electrical contact.

Figure 15:
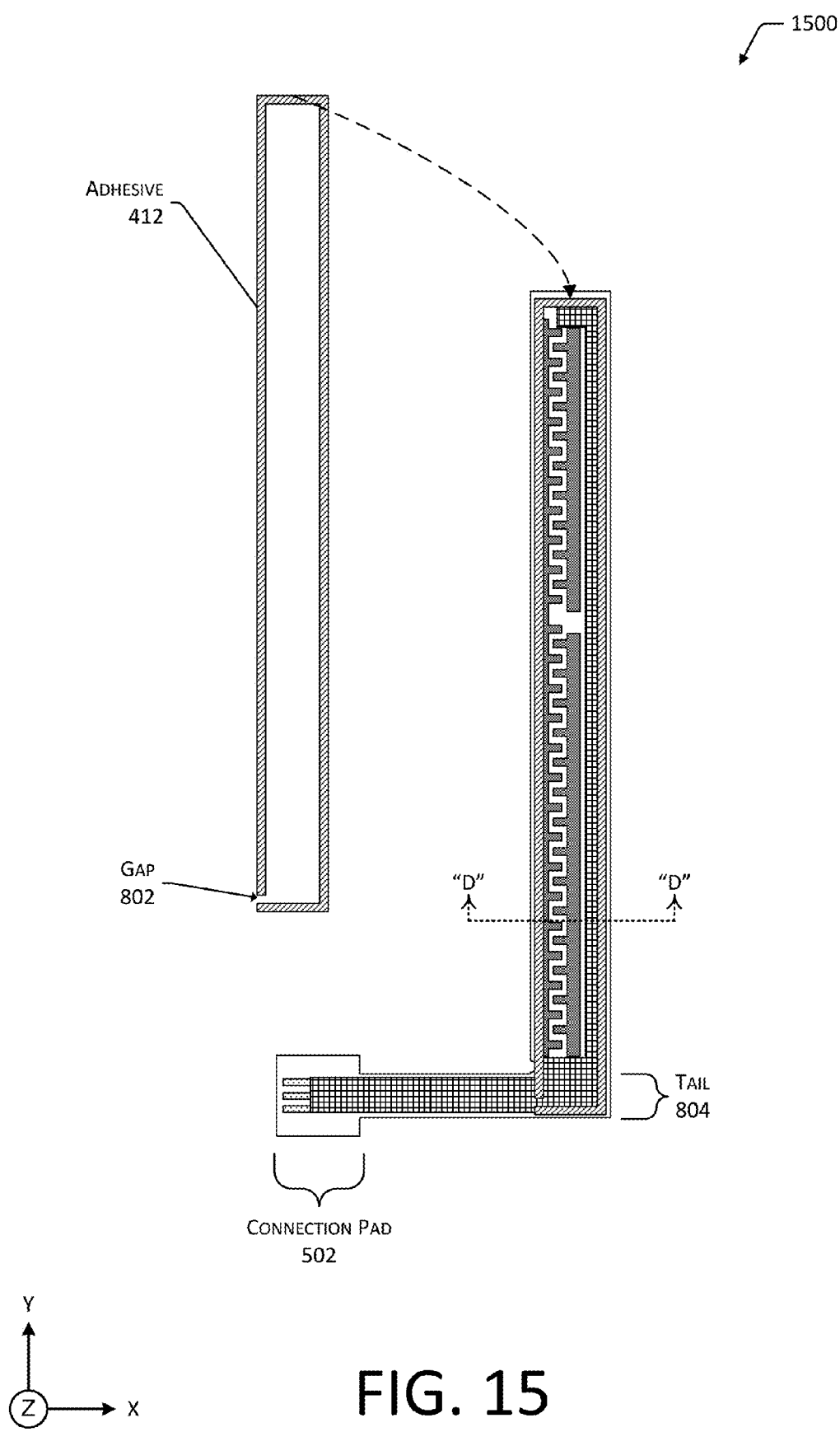

FIG. 15 illustrates application 1500 of the adhesive 412 around a perimeter of the first substrate 402. The adhesive 412 may be arranged as a ring around the perimeter of the first substrate 402. As illustrated above, the gap 802 may be provided in the adhesive 412. The gap 802 may be approximately aligned with a center of the tail 804 which leads to the connection pad 502.

Figure 16:
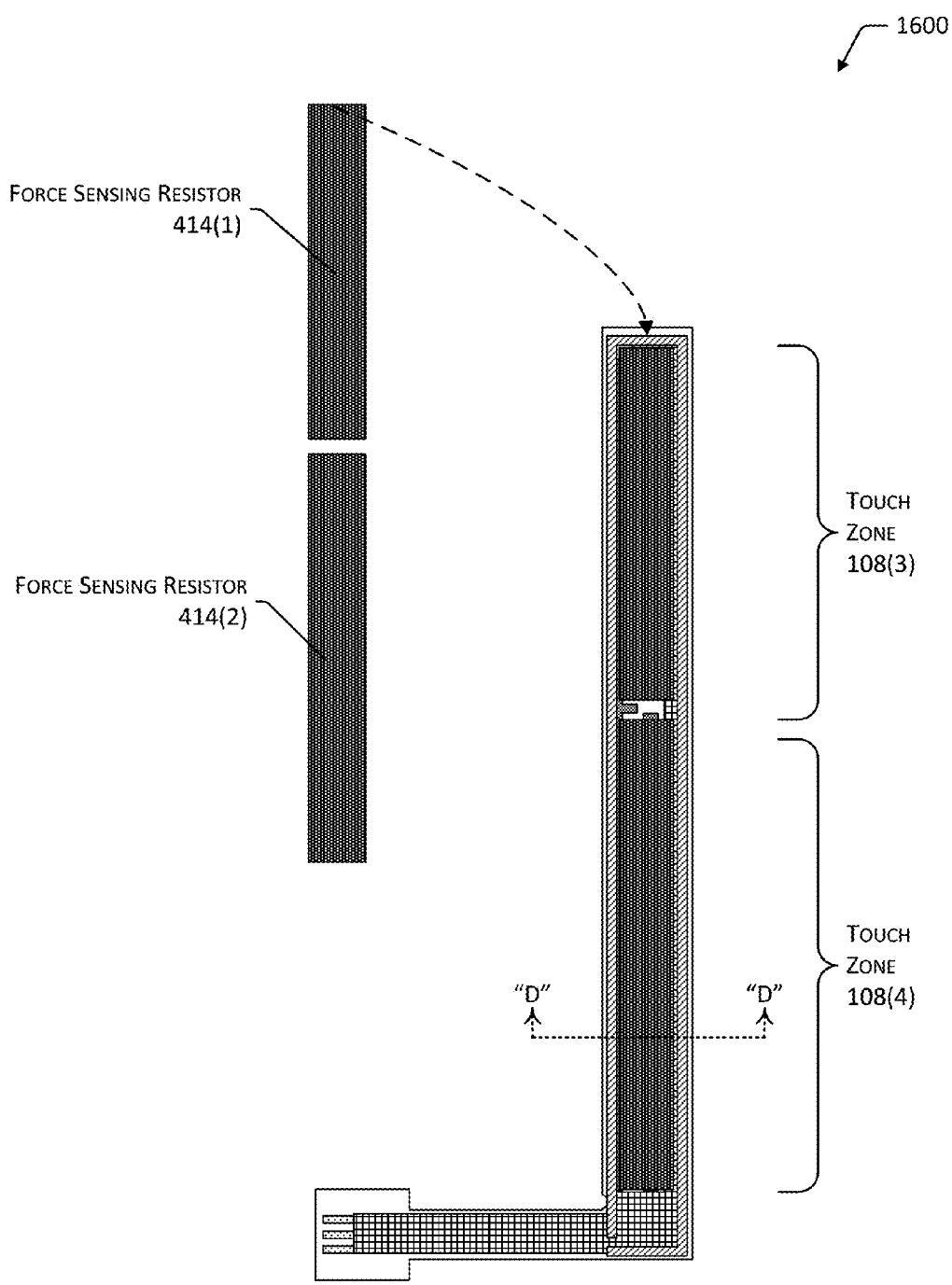

FIG. 16 illustrates application 1600 of the FSR 414 material. In this illustration, two portions of FSR material 414 are applied. Each portion is configured to come into electrical contact with two or more of the carbon 410 traces. For example, the FSR 414(1) is in electrical contact with the carbon 410(1) traces and 410(2), while the FSR 414(2) is in electrical contact with the carbon 410(1) and 410(3), as depicted in FIG. 14.

As described above, each touch zone 108 is defined by a different and electrically separate portion of FSR 414 material. In this illustration, the area defined by the FSR 414(1) provides the touch zone 108(3), while the area defined by the FSR 414(2) defines the touch zone 108(4).

Figure 17:
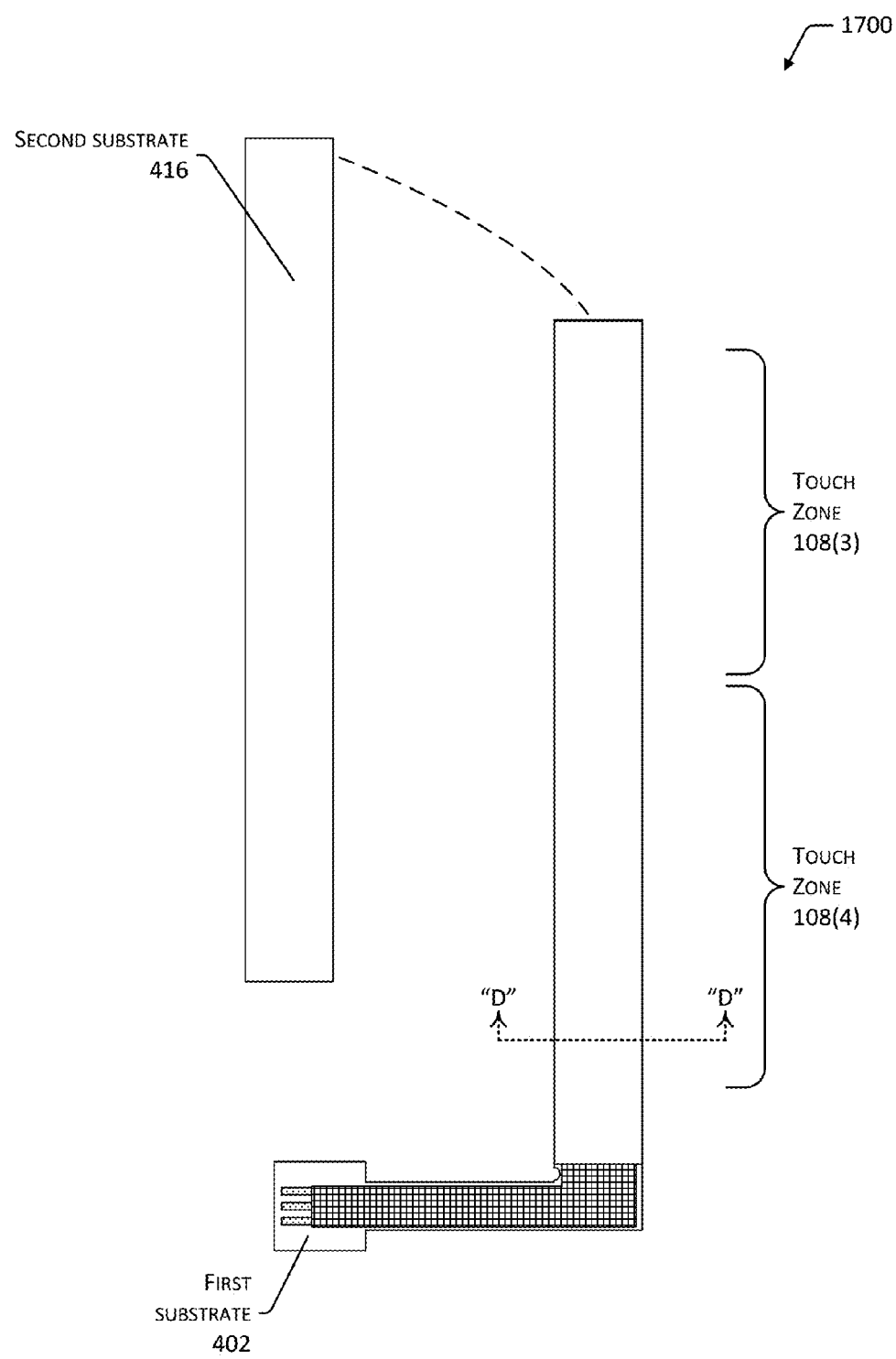

FIG. 17 illustrates application 1700 of the second substrate 416 atop the FSR 414 of FIG. 16 and the adhesive 412 of FIG. 15. With the second substrate 416 in place, the FSR assembly 118 is complete and may be connected to the controller 306(1).

Figure 18:
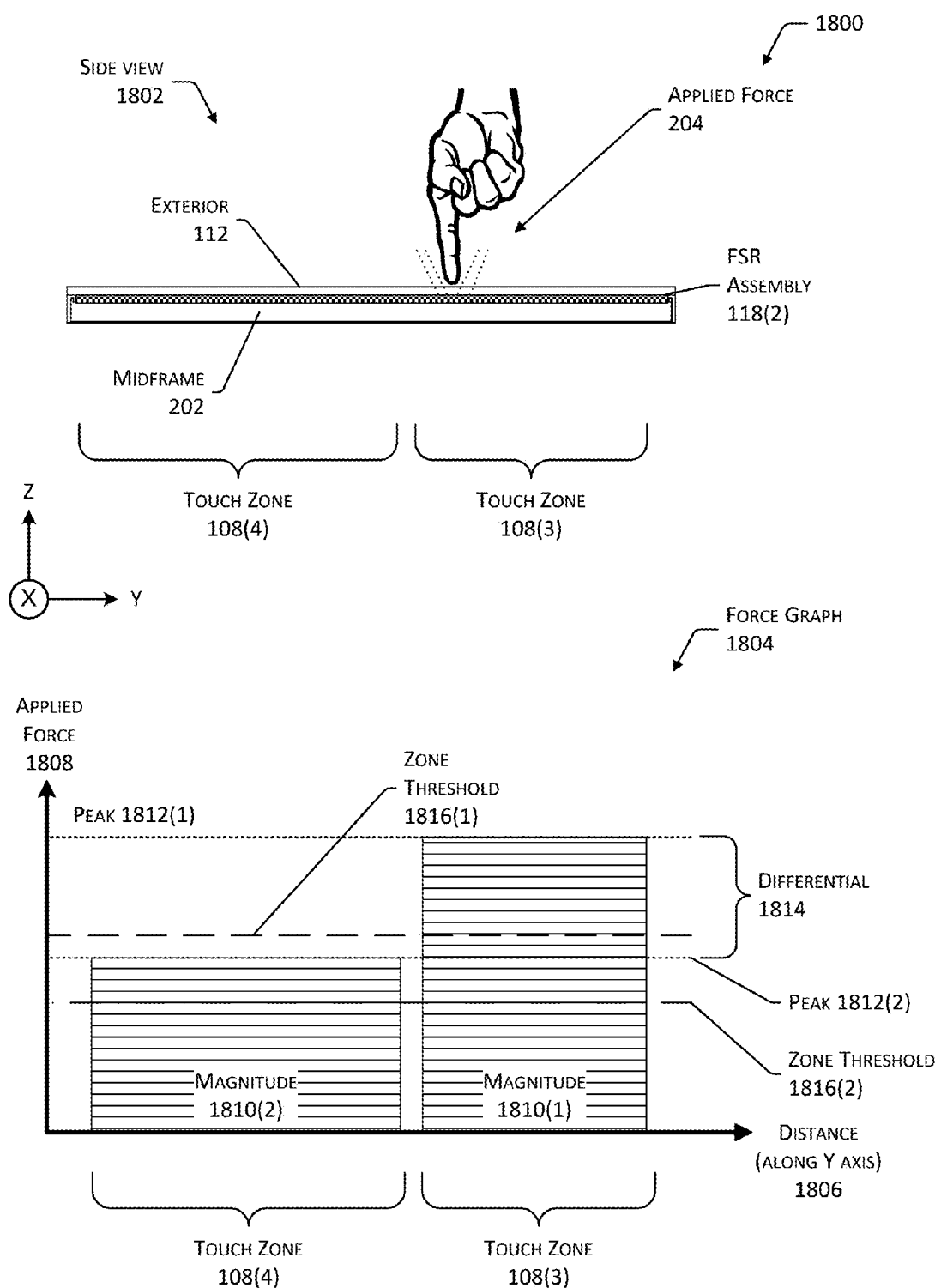
FIG. 18 illustrates a side view of the device and the measured applied force at two adjacent touch zones on a common FSR assembly.

FIG. 18 is a combined illustration 1800 showing a side view 1802 and a force graph 1804 corresponding to the side view 1802. The side view 1802 depicted is along the line "B-B" of FIG. 1. In this illustration the applied force 204 is provided to the exterior 112 of the device 104. The applied force 204 is exerted at a point which is within the touch zone 108(3), but is proximate to the touch zone 108(4). For example, the user may be pressing on a portion of the touch zone 108 which is close to another touch zone 108.

As described above, the applied force 204 results in an induced deflection 206 of the exterior 112(1), 112(2), or both. Due to the sensitivity of the FSR assembly 118, very small induced deflections 206 may result in forces which are measureable by the FSR assembly 118. While the deflections 206 may be localized, the exterior 112 does disperse the applied force 204 over an area. As a result, in some situations the applied force 204 at one touch zone 108 may result in an applied force 204 which is detected in another touch zone 108.

The force graph 1804 illustrates this effect. A horizontal axis indicates distance along the Y axis 1806. A vertical axis indicates magnitude of the applied force 1808 as detected by the FSR assembly 118. As described above, the FSR assembly 118(2) includes two touch zones, touch zone 108(3) and 108(4).

In this illustration, a magnitude 1810(1) of the touch zone 108(3) is depicted with a particular peak 1812(1) magnitude as indicated. Similarly a magnitude 1810(2) of the touch zone 108(4) shows a particular peak 1812(2). Because the exterior 112 distributes some of the applied force 204 across the FSR assembly 118(2), the adjacent touch zone 108(4) may detect part of the applied force 204.

In some situations, some ambiguity may occur as to which of the touch zones 108 the user has intended to activate. A differential 1814 between peaks 1812 may be used to disambiguate which of the touch zones 108 has the applied force 204. The differential 1814 may be determined in one implementation by subtracting a peak magnitude 1812(1) from another peak magnitude 1812(2). In this illustration, the larger peak 1812(1) is associated with the touch zone 108(3). The touch zone 108 corresponding to the peak 1812 which has the largest non-zero differential may be determined by the controller 306(1) to be activated. In this illustration, the differential indicates that the applied force 204 is in the touch zone 108(3). In some implementations the differential 1814 may be determined based on the magnitudes 1810 of the different touch zones 108.

A differential threshold may be specified in some implementations. The controller 306(1) may be configured to have a minimum differential amount, below which the touch zone 108 is not determined to be activated.

A summed magnitude of the applied force 204 is the sum of the magnitude 1810 of the touch zones 108 on the FSR assembly 118. For example, the summed magnitude of the applied force 204 may be considered the sum of the magnitude 1810(1) from the touch zone 108(3) and the magnitude 1810(2) of the second touch zone 108(4) of the FSR assembly 118(2).

In some implementations a summed magnitude threshold may be used to avoid inadvertent activation, such as suppressing force applied by the user gripping or holding the device. When the summed magnitude of applied force 204 meets or exceeds the summed magnitude threshold, one or more of the touch zones 108 may be determined to be activated. However, the applied force 204 below this threshold does not result in a determination that the one or more touch zones 108 have been activated. The summed magnitude threshold may be dynamically adjustable or may be fixed.

Individual touch zones 108 may have individual zone thresholds 1816. The individual zone thresholds 1816 may be used to determine when the touch zone 108 has been activated by the applied force 204. The individual zone thresholds 1816 may differ from one another. For example, the zone threshold 1816(1) associated with the touch zone 108(3) may be higher than the zone threshold 1816(2) associated with the touch zone 108(4). As a result, activation of the touch zone 108(3) may require application of greater force than activation of the touch zone 108(4). The individual zone threshold 1816 may be dynamically adjustable or may be fixed.

In some implementations, the summed magnitude threshold and the individual zone thresholds 1816 may be combined. For example, a determination of activation of the touch zone 108 may be based at least in part on the summed magnitude meeting or exceeding the summed magnitude threshold and an individual zone threshold 1816.

Input from the accelerometer 306(4), orientation sensor, motion sensor, and so forth may be used to dynamically adjust the zone thresholds 1816, summed magnitude threshold, or a combination thereof. For example, the zone thresholds 1816 may be lower while the device 104 is held by a user in a landscape orientation and higher while the device 104 is in a portrait orientation with the user's thumb gripping the device 104 proximate to the touch zones 108.

Figure 19:
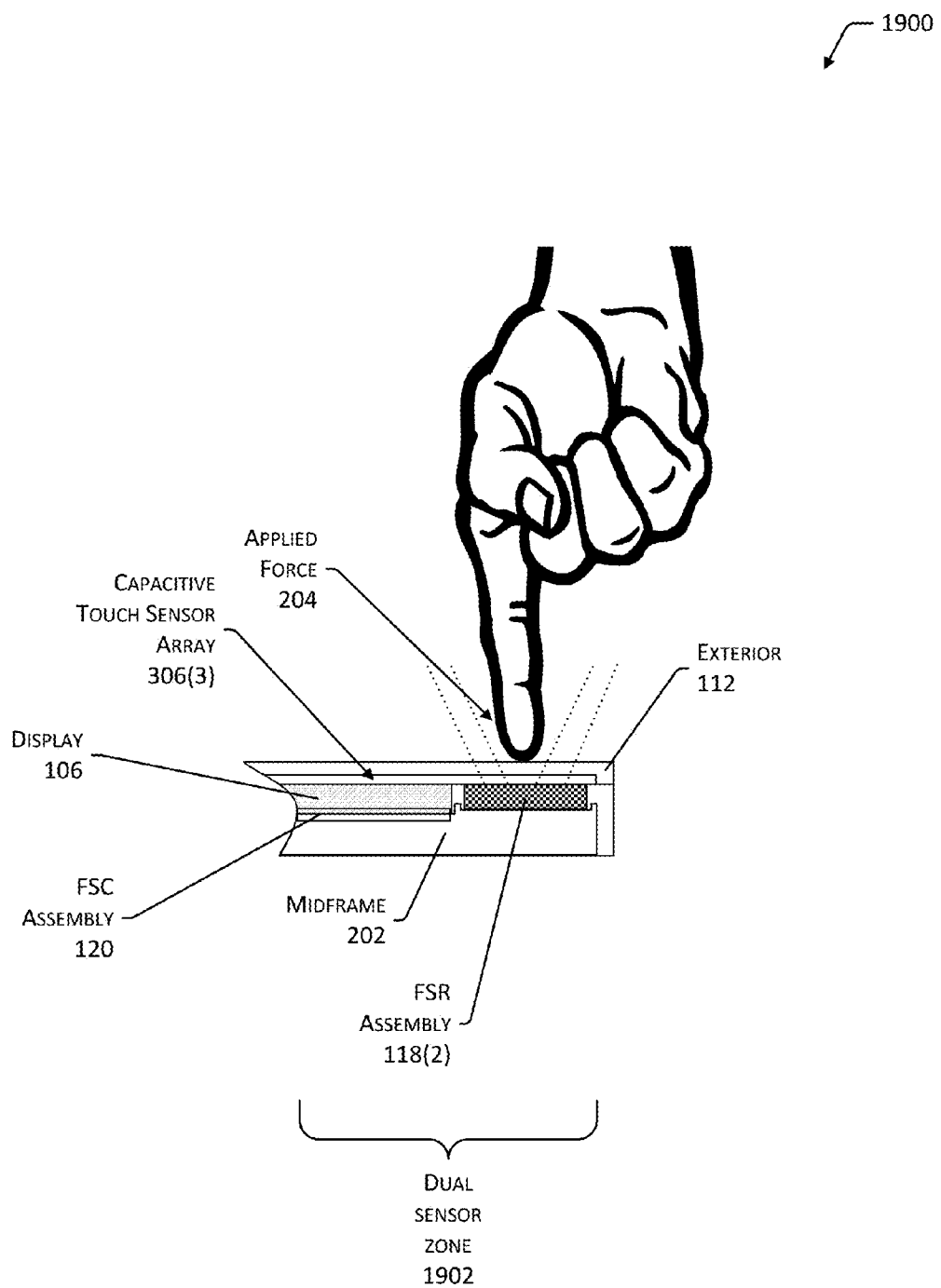
FIG. 19 illustrates an enlarged cross sectional view of the device with a capacitive sensor operating in conjunction with at least a portion of the FSR assembly, allowing for dual sensing of a touch.
Figure 19:
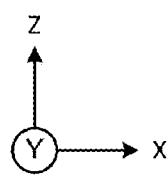

FIG. 19 illustrates an enlarged cross sectional view 1900 of a portion of the device 104. In this illustration, the capacitive touch sensor array 306(3) is depicted. The capacitive touch sensor array 306(3) may be configured to operate in a same area as the FSR assembly 118. As a result, touch outputs from the capacitive touch sensor array 306(3) may be combined with the determination of touch zone 108 activation and the associated magnitude 1810 of the applied force 204.

In this illustration, the capacitive touch sensor array 306(3) is arranged behind the exterior 112 and in front of the FSR assembly 118. The area in which the sensors overlap is designated the dual sensor zone 1902.

In one implementation data from the capacitive touch sensor array 306(3) may be used to determine that the user is holding the device 104 with a thumb, and thus the thresholds for activation of the touch zones 108 may be increased. This increase may reduce the incidence of inadvertent activation of the touch zone 108 resulting from the grip of the user.

Figure 20:
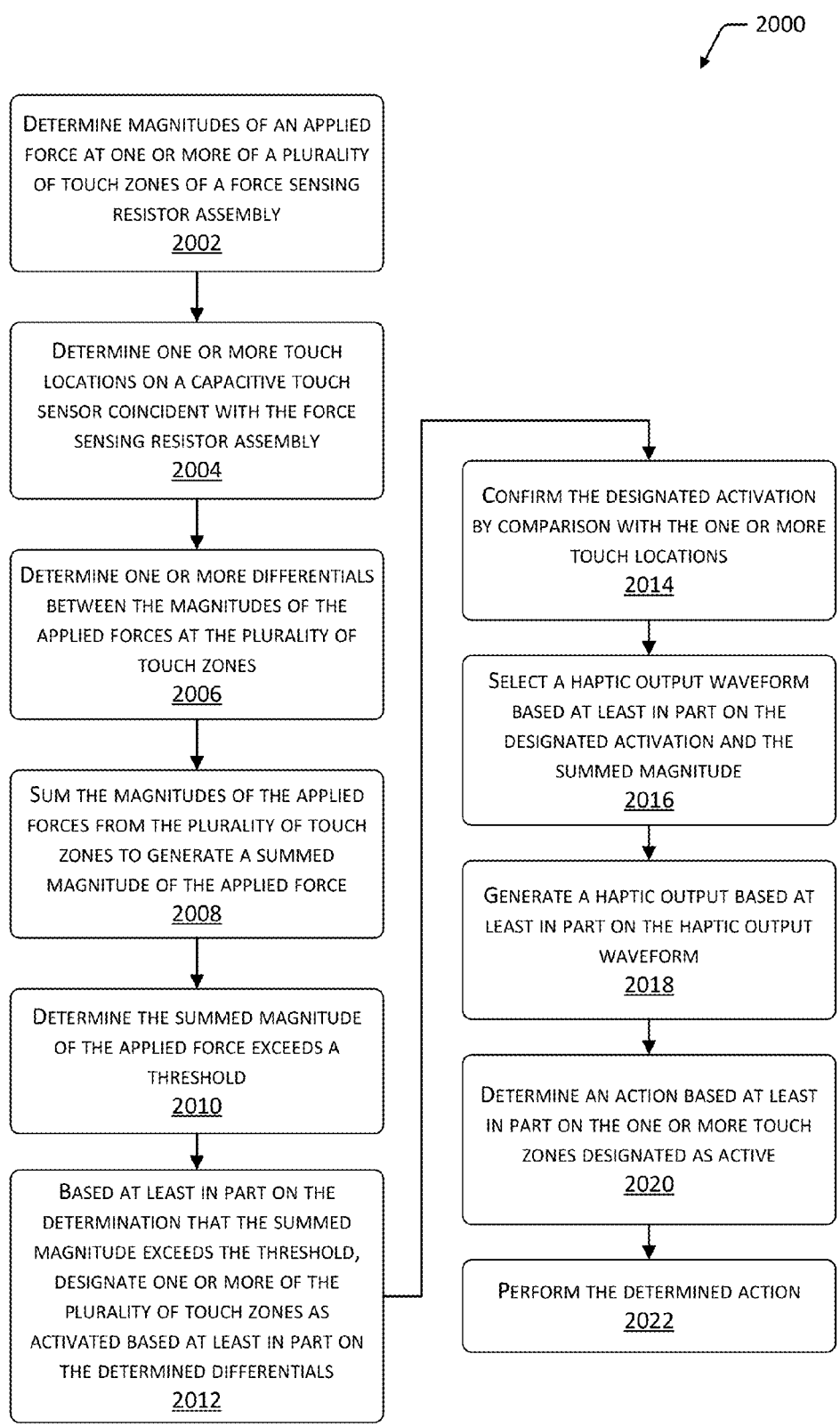
FIG. 20 is a flow diagram of a process of detecting input using the FSR assembly.

FIG. 20 is a flow diagram 2000 of a process of detecting input using the FSR assembly 118. In some implementations, this process may be provided by the controller 306(1), the processor 302, or a combination thereof as coupled to the FSR assembly 118.

Block 2002 determines magnitudes 1810 of an applied force 204 at one or more of a plurality of touch zones 108 of the FSR assembly 118. For example, the controller 306(1) may measure the resistance across two of the conductors 406 in the touch zone 108 and determine the magnitude 1810 based on the measured resistance. The magnitude 1810 of the applied force 204 may be determined for one or more of the touch zones 108.

In some implementations where the capacitive touch sensor array 306(3) is present and the applied force 204 is within the dual sensor zone 1902, block 2004 determines one or more touch locations on the capacitive touch sensor array 306(3). As described above, the dual sensor zone 1902 occurs when the capacitive touch sensor array 306(3) and the touch zone 108 are coincident or proximate with one another.

Block 2006 determines one or more differentials 1814. As described above, the differential 1814 between the magnitudes 1810 of the applied forces 204 may be determined by subtracting a second peak magnitude 1812(2) from one of the plurality of touch zones 108 from a first peak magnitude 1812(1) from a different one of the plurality of touch zones 108. In some implementations the summed magnitude may be used instead of, or in addition to, the peak magnitude 1812.

Block 2008 sums the magnitudes 1810 of the applied forces from the plurality of touch zones 108 to generate a summed magnitude of the applied force 204. Block 2010 determines when the summed magnitude of the applied force 204 exceeds a threshold. This threshold may be designated an overall threshold. As described above, the threshold may be static or dynamically adjustable. For example, the threshold may vary to adjust for the user gripping the touch zone 108.

Based at least in part on the summed magnitude exceeding the threshold, block 2012 designates one or more of the plurality of touch zones 108 as activated based at least in part on the determined differentials 1814. For example, the controller 306(1) may determine that the summed magnitude indicates an intentional touch, and the determined differential 1814 may be used to disambiguate between the two touch zones 108(3) and 108(4).

In some implementations individual zone thresholds 1816 may be specified. A block may determine the magnitudes 1810 of the applied forces 204 at the plurality of touch zones 108 exceed a second threshold such as the individual zone threshold 1816. The designation that the one or more of the plurality of touch zones 108 is activated may further be based at least in part on the magnitudes 1810 exceeding the individual zone threshold 1816.

The thresholds may be dynamically adjusted such that the threshold value increases at a first rate while the applied force 204 is present at the one or more of the touch zones 108 of the FSR assembly 118 and decreases at a second rate while the applied force 204 is absent at the one or more of the touch zones 108 of the FSR assembly 118. The first rate may be less than the second rate. In one implementation the first rate may be expressed as a linear function while the second rate may be expressed as an exponential decay function.

Where the capacitive touch sensor array 306(3) provides data for the dual sensor zone 1902, block 2014 confirms the designated activation of the one or more touch zones 108 by comparison with the one or more touch locations.

Block 2016 selects a haptic output waveform based at least in part on the designated activation. For example, activation of the touch zone 108(3) may be associated with a first haptic output waveform which provides a soft dome-switch click effect, while activation of the touch zone 108(4) may be associated with the second haptic output waveform which provides a harder mechanical switch click effect.

Block 2018 generates, with a haptic generator 306(2), a haptic output based at least in part on the haptic output waveform. For example, the controller 306(1) may provide an electrical output signal corresponding to the haptic output waveform to a piezoelectric haptic device.

Block 2020 determines an action based at least in part on the one or more of the designated activated touch zones 108. For example, activation of the touch zones 108(1) or 108(3) may result in going back a page in an e-book presented on the display 106. These actions may include changing pages, scrolling through a list, selecting an item in presented in the user interface, and so forth. The action may also be based at least in part on a sequence of touch zone 108 activations. For example, a user pressing and sliding a finger from the first touch zone 108(1) to the second touch zone 108(2) may result in an action of scrolling down a web page presented on the display 106.

In some implementations, the action may be further based at least in part on the summed magnitude of the applied force 204. For example, a light press may change pages while a hard press may change chapters.

Block 2022 performs the determined action. For example, the activation of the touch zone 108(3) changes the page presented to a previous page. In some implementations several actions may be associated with the activation.

Figure 21:
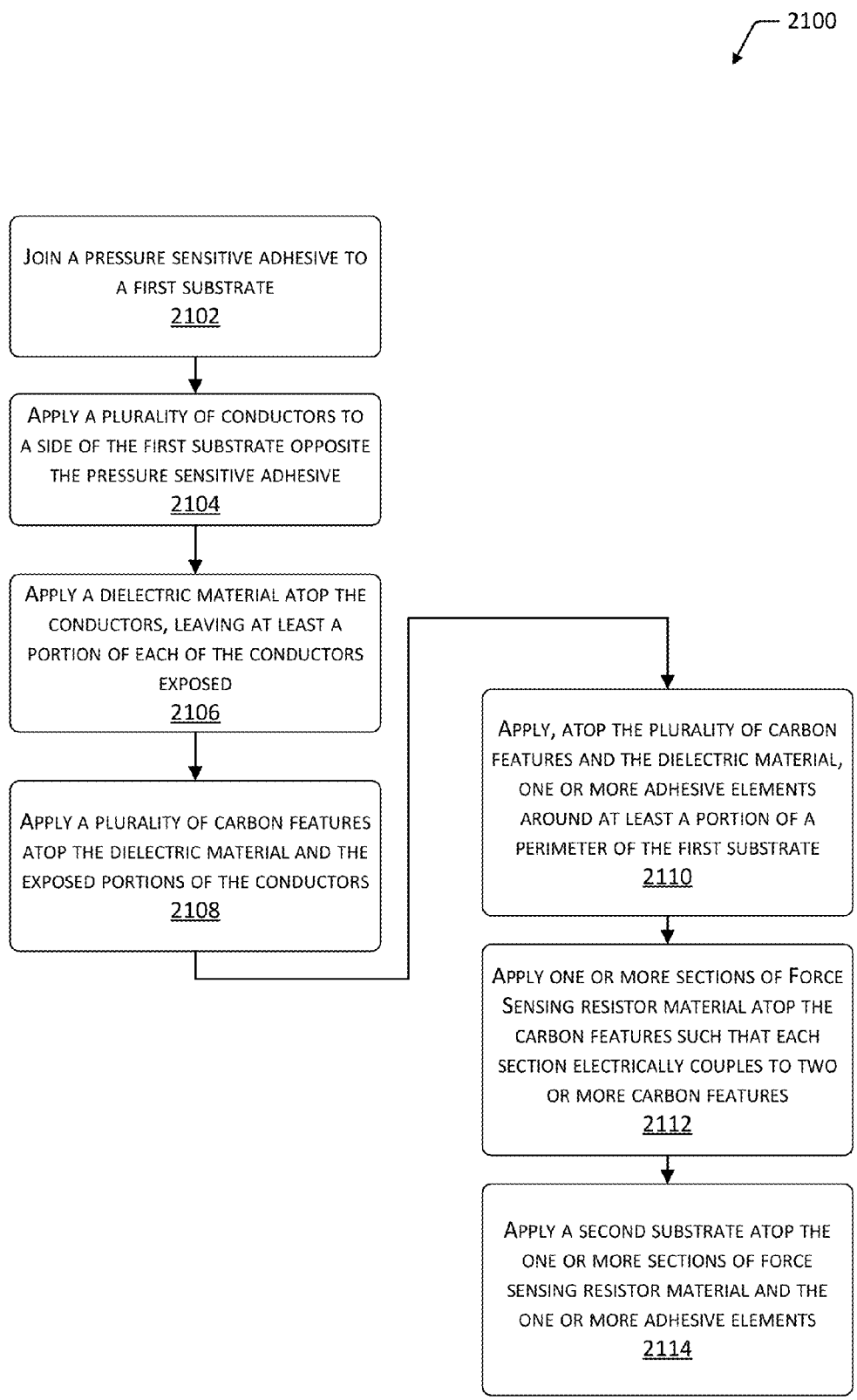
FIG. 21 is a flow diagram of assembling the FSR assembly.

FIG. 21 is a flow diagram 2100 of assembling the FSR assembly 118. The assembly may be performed by manual, automated, or combined manual and automated actions.

Block 2102 joins a pressure sensitive adhesive 404 to a first substrate 402. Block 2104 applies a plurality of conductors 406 to a side of the first substrate 402 which is opposite the pressure sensitive adhesive 404. Block 2106 applies the dielectric material 408 atop the conductors 406, leaving at least a portion of the conductors 406 exposed.

Block 2108 applies a plurality of carbon features 410 atop the dielectric material 408 and the exposed portion of the conductors 406. Block 2110 applies, atop the plurality of carbon 410 features and the dielectric material 408, one or more adhesive elements 412 around at least a portion of a perimeter of the first substrate 402.

Block 2112 applies one or more sections of FSR 414 material atop the carbon 410 features such that each section electrically couples to two or more carbon 410 features. As described above, the FSR 414 material may comprise a conductive polymer.

Block 2114 applies a second substrate 416 atop the one or more sections of FSR 414 material and the one or more adhesive elements 412. As described above, the first substrate 402 and the second substrate 416 may comprise a polyethylene terephthalate film (PET).

As used in this disclosure, the term "applying" may include one or more of vapor deposition, fluidic material deposition using a plurality of jets, physical vapor deposition, material transfer from a subsequently removed carrier, screen printing, lamination, or selective laser sintering. Different application processes may be used during construction of the FSR assembly 118. For example, the first substrate 402 and the PSA 404 may be laminated together, while the conductors 406 are screen printed into the first substrate 402.

Figure 22:
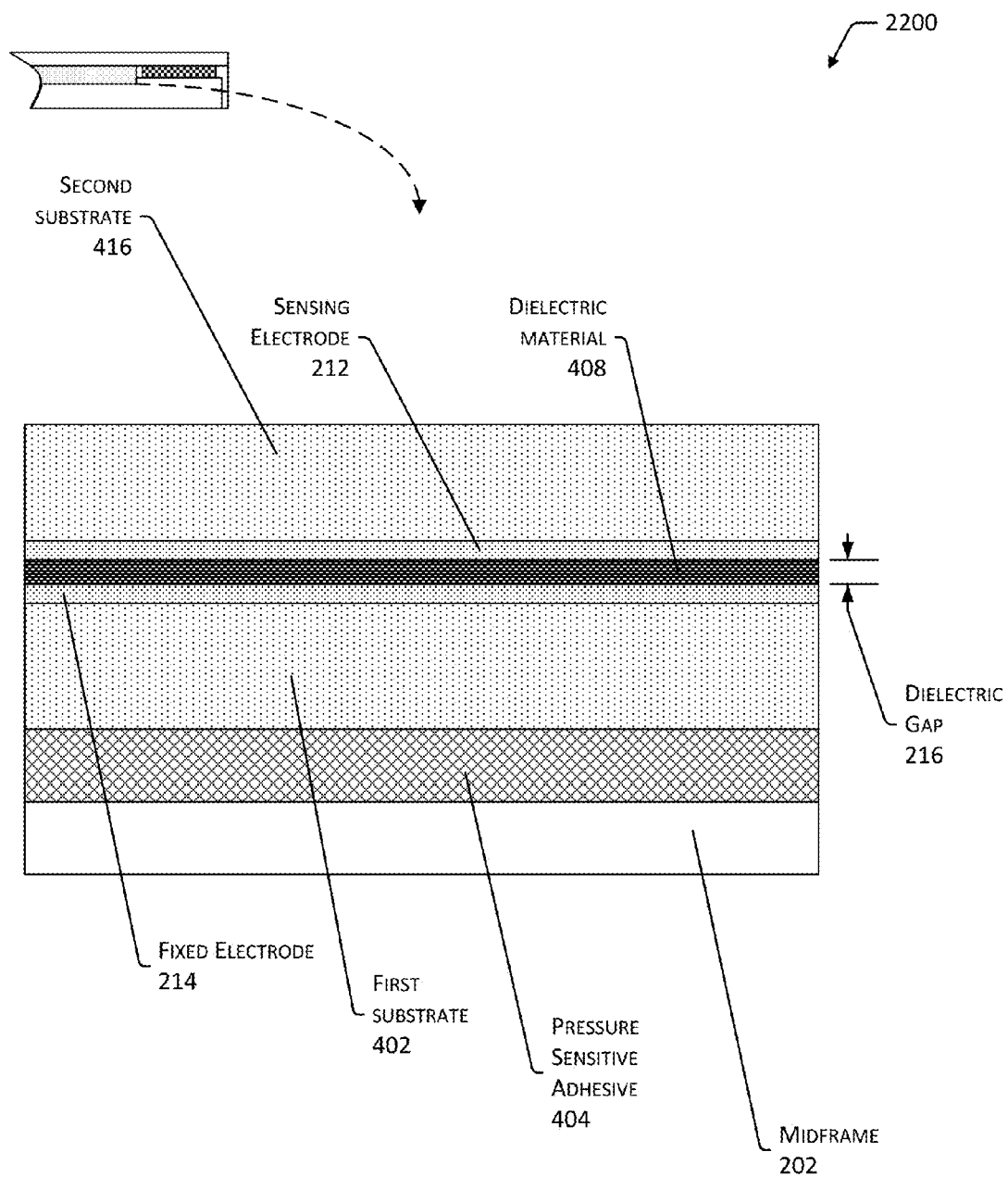
FIG. 22 is a cross sectional view of the FSC assembly illustrating the different layers in the assembly.

FIG. 22 is an enlarged cross sectional view 2200 along the line "A-A" of the FSC assembly 120. The depicted portion of the FSC assembly 120 is that which is within one of the touch zones 108, and is thus sensitive to the applied force 204. Other portions of the FSC assembly 120, such as a connection pad may have an alternative configuration.

The FSC assembly 120 may comprise a first substrate 402 such as described above. The PSA 404 may be applied to the back of the first substrate 402. The PSA 404 may be used to adhere at least a portion of the FSC assembly 120 to the midframe 202 or other components.

On the front of the first substrate 402, one or more fixed electrodes 214 are applied in a pattern configured to provide for one or more electrically discrete touch zones 108. For example, four fixed electrodes 214 may be provided in quadrants as depicted below in FIG. 23. The fixed electrodes 214 may comprise a conductive polymer, metal, and so forth. For example, in some implementations the fixed electrodes 214 may comprise silver or aluminum.

One or more portions of dielectric material 408 may be applied to the fixed electrodes 214. The dielectric material 408 may comprise a gas, polymer, ceramic, aerogel, or other material which acts as an insulator at the voltages used in the FSC assembly 120. The dielectric material 408 may be resilient such that it rebounds after removal of the applied force 204.

One or more sensing electrodes 212 are arranged atop the dielectric material 408. The sensing electrodes 212 may comprise a conductive polymer, metal, and so forth. For example, in some implementations the sensing electrodes 212 may comprise silver or aluminum.

In some implementations, a single or common sensing electrode 212 may be used, or separate sensing electrodes 212 may be provided to correspond with one or more of the fixed electrodes 214. The sensing electrodes 212 may be affixed to a second substrate 416 such as described above. In one implementation, the second substrate 416 may be affixed to the display 106. In another implementation, one or more of the first substrate 402 or the second substrate 416 may be omitted, and the electrodes may be deposited or incorporated into other components. For example, a ground plane on the display 106 may act as the sensing electrode 212.

Figure 23:
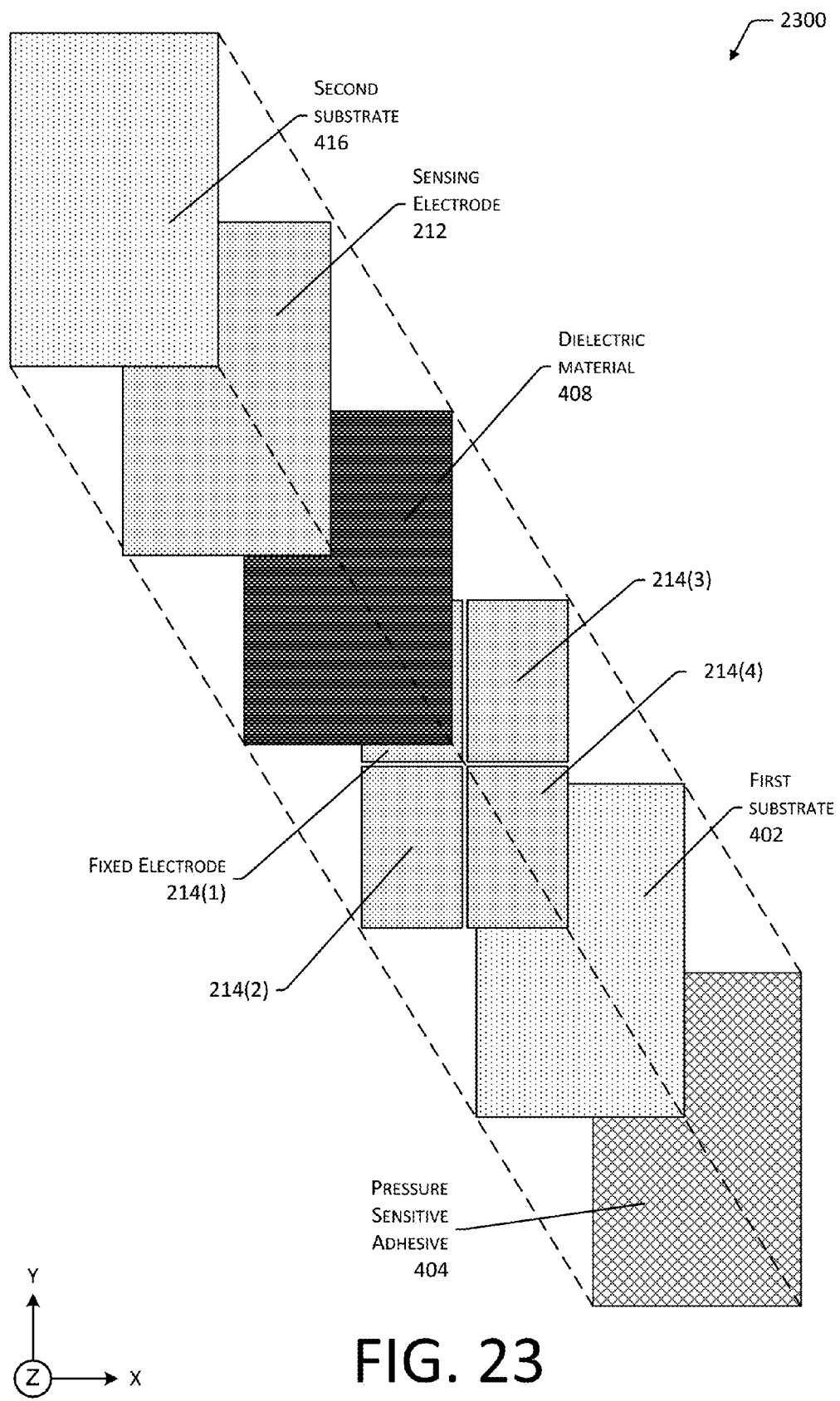
FIG. 23 illustrates an expanded view of the various layers in the FSC assembly.

FIG. 23 illustrates an expanded view 2300 of the various layers in the FSC assembly 120 as described in FIG. 22. In this illustration the sensing electrode 212 is depicted as a single electrode, while four fixed electrodes 214(1)-(4) are provided and arranged to correspond to quadrants of the display 106. Each of these quadrants forms a discrete touch zone 108. With the configuration depicted here, the controller 306(1) may determine which quadrant on the display 106 the user is applying force 204 and the magnitude 1810 of that force. As described above with respect to FIG. 19, inputs from different sensors may be combined. For example, the magnitude data about the applied force 204 may be used in conjunction with the input from the capacitive touch sensor array 306(3) to provide for actions which are determined by where on the display 106 the user presses and how hard.

Figure 24:
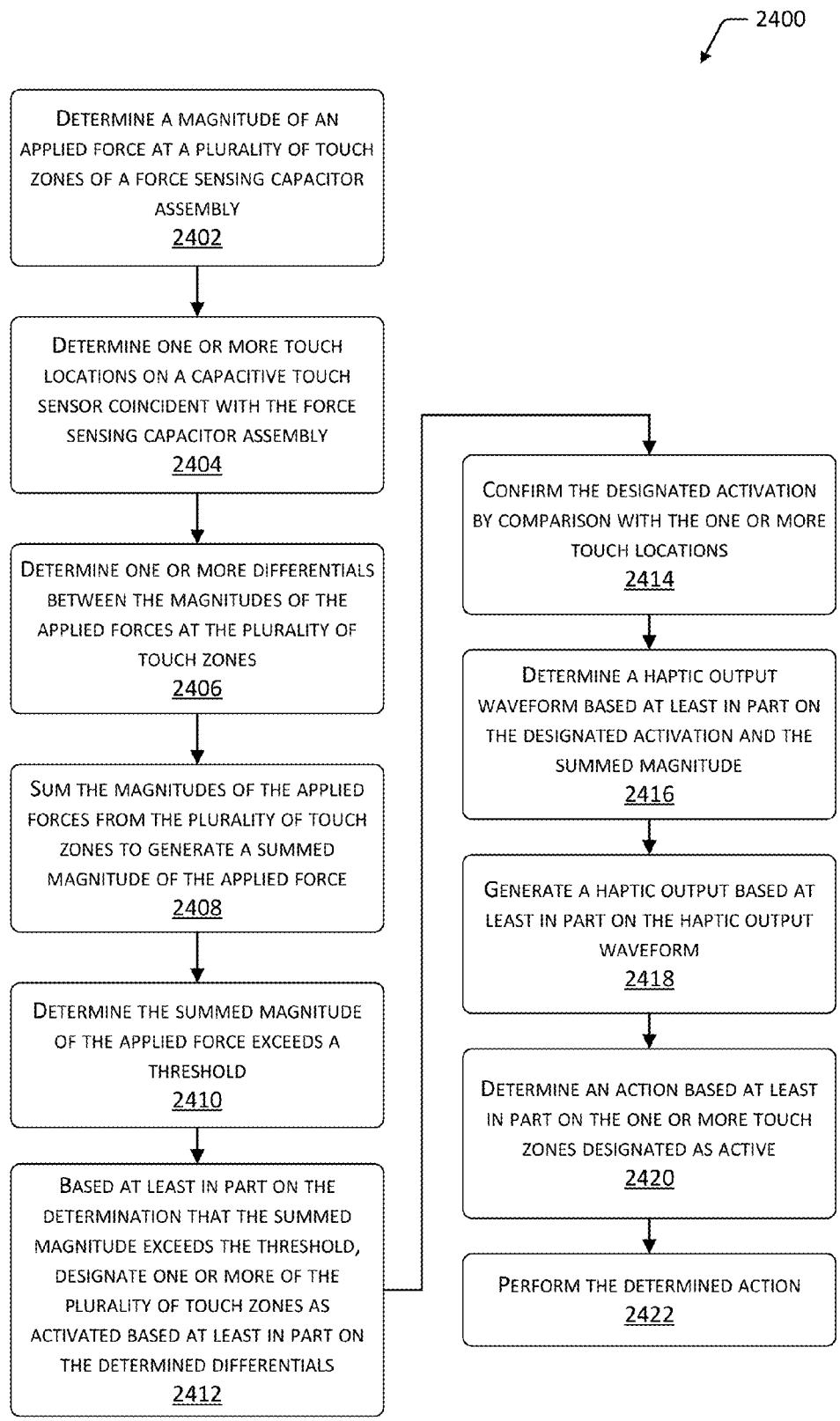
FIG. 24 is a flow diagram of a process of detecting input using the FSC assembly.

FIG. 24 is a flow diagram 2400 of a process of detecting input using the FSC assembly 120. In some implementations, this process may be provided by the controller 306(1), the processor 302, or a combination thereof as coupled to the FSC assembly 120.

Block 2402 determines a magnitude 1810 of an applied force 204 at a plurality of touch zones 108 of the FSC assembly 120. For example, the controller 306(1) may measure the capacitance across the sensing electrode 212 and the fixed electrode 214 in the touch zone 108 and determine the magnitude 1810 based on the measured capacitance.

In some implementations where the capacitive touch sensor array 306(3) is present and the applied force 204 is within the dual sensor zone 1902, block 2404 determines one or more touch locations on the capacitive touch sensor array 306(3). As described above, the dual sensor zone 1902 occurs when the capacitive touch sensor array 306(3) and the touch zone 108 are coincident or proximate with one another.

Block 2406 determines one or more differentials 1814. As described above, the differential 1814 between the magnitudes 1810 of the applied forces 204 may be determined by subtracting a second peak magnitude 1812(2) from one of the plurality of touch zones 108 from a first peak magnitude 1812(1) of a different one of the plurality of touch zones 108. In some implementations the summed magnitude may be used instead of, or in addition to, the peak magnitude 1812.

Block 2408 sums the magnitudes 1810 of the applied forces from the plurality of touch zones 108 to generate a summed magnitude of the applied force 204. Block 2410 determines when the summed magnitude of the applied force 204 exceeds a threshold. This threshold may be designated an overall threshold. As described above, the threshold may be static or dynamically adjustable. For example, the threshold may vary to adjust for the user gripping the touch zone 108.

Based at least in part on the summed magnitude exceeding the threshold, block 2412 designates one or more of the plurality of touch zones 108 as activated based at least in part on the determined differentials 1814. For example, the controller 306(1) may determine that the summed magnitude indicates an intentional touch, and the determined differential 1814 may be used to disambiguate between the two touch zones 108(7) and 108(8).

In some implementations individual zone thresholds 1816 may be specified. A block may determine the magnitudes 1810 of the applied forces 204 at the plurality of touch zones 108 exceed a second threshold, such as the individual zone threshold 1816. The designation that the one or more of the plurality of touch zones 108 is activated may further be based at least in part on the magnitudes 1810 exceeding the individual zone threshold 1816.

The thresholds may be dynamically adjusted such that the threshold value increases at a first rate while the applied force 204 is present at the one or more of the touch zones 108 of the FSC assembly 120 and decreases at a second rate while the applied force 204 is absent at the one or more of the touch zones 108 of the FSC assembly 120. The first rate may be less than the second rate. In one implementation the first rate may be expressed as a linear function while the second rate may be expressed as an exponential decay function.

Where the capacitive touch sensor array 306(3) provides data for the dual sensor zone 1902, block 2214 confirms the designated activation of the one or more touch zones 108 by comparison with the one or more touch locations.

Block 2416 determines a haptic output waveform based at least in part on the designated activation. For example, activation of the touch zone 108(7) may be associated with a first haptic output waveform which provides a soft dome-switch click effect, while activation of the touch zone 108(8) may be associated with the second haptic output waveform which provides a harder mechanical switch click effect.

Block 2418 generates, with a haptic generator 306(2), a haptic output based at least in part on the haptic output waveform. For example, the controller 306(1) may provide an electrical output signal corresponding to the haptic output waveform to a piezoelectric haptic device.

Block 2420 determines an action based at least in part on the one or more of the designated activated touch zones 108. For example, activation of the touch zones 108(5) or 108(7) may result in going back a page in an e-book presented on the display 106. These actions may include changing pages, scrolling through a list, selecting an item presented in the user interface, and so forth. The action may also be based at least in part on a sequence of touch zone 108 activations. For example, a user pressing and sliding a finger from the first touch zone 108(5) to the second touch zone 108(6) may result in an action of scrolling down a web page presented on the display 106.

In some implementations, the action may be further based at least in part on the summed magnitude of the applied force 204. For example, a light press may change pages while a hard press may change chapters.

Block 2422 performs the determined action. For example, the activation of the touch zone 108(5) changes the page presented to a previous page. In some implementations several actions may be associated with the activation.

Figure 25:
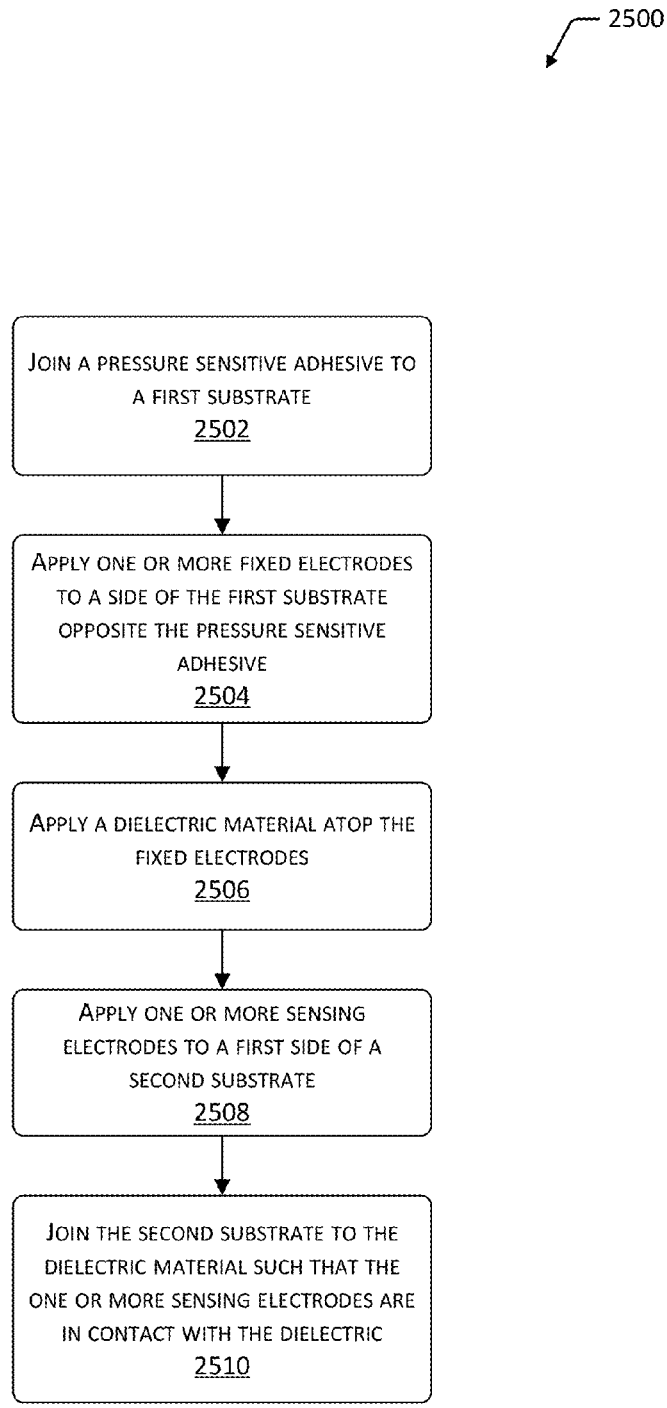
FIG. 25 is a flow diagram of assembling the FSC assembly.

FIG. 25 is a flow diagram 2500 of assembling the FSC assembly 120. The assembly may be performed by manual, automated, or combined manual and automated actions.

Block 2502 joins a pressure sensitive adhesive 404 to a first substrate 402. Block 2504 applies one or more fixed electrodes 214 to a side of the first substrate 402 which is opposite the pressure sensitive adhesive 404.

Block 2506 applies the dielectric material 408 atop the fixed electrodes 214. In some implementations the dielectric material 408 may comprise a layer of material which is inserted between the sensing electrodes 212 and the fixed electrodes 214. In yet another implementation the dielectric material 408 may comprise a gas or a gap.

Block 2508 applies the one or more sensing electrodes 216 to a first side of a second substrate 416. Block 2510 joins the second substrate 416 to the dielectric material 408 such that the one or more sensing electrodes 212 are in contact with the dielectric material 408.

Those having ordinary skill in the art will readily recognize that certain components, steps, or operations illustrated in in the figures above can be eliminated, taken in an alternate order, or otherwise rearranged. Moreover, the methods described above may be implemented as one or more software programs for a computer system and are encoded in a computer-readable storage medium as instructions executable on one or more processors.

The computer-readable storage medium can be any one of an electronic storage medium, a magnetic storage medium, an optical storage medium, a quantum storage medium, and so forth. Separate instances of these programs can be executed on or distributed across separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations.

Although the present disclosure is written with respect to specific embodiments and implementations, various changes and modifications may be suggested to one skilled in the art, and it is intended that the present disclosure encompass such changes and modifications that fall within the scope of the appended claims.

What is claimed is:

1. A device comprising:
an unbroken portion of an exterior of the device, the unbroken portion comprising a structure having an exterior surface and an interior surface;
a force sensing resistor assembly comprising a first touch zone and a second touch zone, each zone configured to be responsive to an incident force, wherein the force sensing resistor assembly is proximate to at least a portion of the interior surface of the structure;
a controller coupled to the force sensing resistor assembly, the controller configured to:
determine a first magnitude of a first applied force at the first touch zone and a second magnitude of a second applied force at the second touch zone of the force sensing resistor assembly;
sum the first magnitude and the second magnitude to generate a summed magnitude of applied force;
determine that the summed magnitude of applied force exceeds a first threshold;
based on the summed magnitude of applied force exceeding the first threshold, dynamically adjust the first threshold; and
determine that one or more of a plurality of touch zones, which correspond with the first magnitude or the second magnitude, are activated.

2. The device of claim 1, the controller further configured to:
subtract the first magnitude from the second magnitude to determine a differential;
determine the differential exceeds a second threshold; and
determine the first touch zone is activated based on the differential exceeding the second threshold.

3. The device of claim 1, the controller further configured to:
determine the first applied force exceeds a second threshold;
determine the second applied force is less than or equal to the second threshold; and
determine the first touch zone is activated based on the second applied force being less than or equal to the second threshold.

4. The device of claim 1, the controller further configured to:
generate a first comparison of the first applied force to a second threshold;
generate a second comparison of the second applied force to a third threshold;
dynamically increase one or more of the second threshold or the third threshold when the magnitude of one or more of the first applied force or the second applied force is greater than a fourth threshold;
dynamically decrease the one or more of the second threshold or the third threshold when the magnitude of the one or more of the first applied force or the second applied force is less than or equal to the fourth threshold; and
wherein the controller is configured to determine one or more of the first touch zone or the second touch zone is activated based on the first comparison and the second comparison.

5. The device of claim 4, wherein the increase of the one or more of the second threshold or the third threshold is expressed as a linear function; and
wherein the decrease of the one or more of the second threshold or the third threshold is expressed as an exponential decay function.

6. The device of claim 1, the force sensing resistor assembly comprising:

a substrate;

a plurality of conductors on the substrate;

a plurality of touch zones of carbon in contact with at least a touch zone of the plurality of conductors;

a dielectric material in contact with at least the touch zone of the plurality of conductors and insulating the at least touch zone of the plurality of conductors from the carbon; and a force sensing resistor material in contact with the plurality of touch zones of carbon.

7. A method comprising:

determining magnitudes of an applied force at one or more of a plurality of touch zones of a force sensing resistor assembly;

determining differentials between a first magnitude of the applied force at the one or more of the plurality of touch zones from a second magnitude from a different one of the one or more of the plurality of touch zones;

summing the magnitudes from the plurality of touch zones to generate a summed magnitude of the applied force;

determining that the summed magnitude of the applied force exceeds a threshold;

based on the summed magnitude of the applied force exceeding the threshold, dynamically adjusting the threshold of the applied force at the plurality of touch zones; and based at least in part on the summed magnitude exceeding the threshold, designating the one or more of the plurality of touch zones as activated based at least in part on the determined differentials.

8. The method of claim 7, the determining of the differentials between the first magnitude of the applied force and the second magnitude of the applied force at the one or more of the plurality of touch zones comprising subtracting the first magnitude from the one or more of the plurality of touch zones from the second magnitude from a different one of the plurality of touch zones.

9. The method of claim 7, further comprising determining that the first magnitude of the applied force and the second magnitude of the applied force at the one or more of the plurality of touch zones exceed a second threshold; and wherein the designating the one or more of the plurality of touch zones as activated is further based at least in part on the first magnitude or the second magnitude exceeding the second threshold.

10. The method of claim 7, wherein the threshold is dynamically adjusted over time such that:

the threshold increases at a first rate while the applied force is present at the one or more of the plurality of touch zones; and the threshold decreases at a second rate while the applied force is absent at the one or more of the plurality of touch zones, and wherein the first rate is less than the second rate.

11. The method of claim 7, further comprising:

selecting a haptic output waveform based at least in part on the designated activation; and generating, with a haptic generator, a haptic output based at least in part on the haptic output waveform.

12. The method of claim 7, further comprising:

determining an action based at least in part on the designated one or more touch zones; and performing the determined action.

13. The method of claim 12, wherein the determining the action is further based at least in part on the summed magnitude of the applied force.

14. The method of claim 7, further comprising:

determining one or more activated touch locations on a capacitive touch sensor proximate with the force sensing resistor assembly; and confirming the designated activation of the one or more of the plurality of touch zones by comparing the designated one or more of the plurality of touch zones with the one or more activated touch locations.

15. A device comprising:

an unbroken portion of an exterior of the device, the unbroken portion comprising a structure having an exterior surface and an interior surface;

one or more force sensing input devices proximate to at least a portion of the interior surface of the structure, each force sensing input device comprising one or more touch zones and each touch zone responsive to an incident force;

a controller coupled to the one or more force sensing input devices, the controller configured to:

determine that magnitudes of applied force at a plurality of touch zones; and based on the magnitudes of the applied force exceeding a first threshold, dynamically adjust the first threshold of an applied force at the plurality of touch zones; and activate one or more of the plurality of touch zones which correspond with the magnitudes of the applied force.

16. The device of claim 15, the controller further configured to:

sum a plurality of magnitudes to generate a summed magnitude of applied force;

determine the summed magnitude of applied force exceeding the first threshold; and based on the summed magnitude of applied force exceeding the first threshold, determine that the one or more of the plurality of touch zones are activated.

17. The device of claim 15, the controller further configured to:

subtract the magnitude of a first applied force from a second applied force to determine a differential;

determine that the differential exceeds a second threshold; and based on the differential exceeding the second threshold, determine a first touch zone is activated.

18. The device of claim 15, the controller further configured to:

determine a first magnitude exceeds the first threshold; and determine a first touch zone is activated.

19. The device of claim 15, the controller further configured to:

increase the first threshold of the applied force at the plurality of touch zones when a first magnitude of the applied force is greater than a second threshold;

decrease the first threshold of the applied force at the plurality of touch zones when the first magnitude of the applied force is less than or equal to the second threshold; and determine the one or more of the plurality of touch zones are activated based on a comparison of a magnitude of an applied force of a touch zone of the one or more of the plurality of touch zones with the first threshold.

20. The device of claim 19, wherein the increase of the first threshold is a linear function; and
wherein the decrease of the first threshold is an exponential decay function.

* * * * *